(12) United States Patent
Cerwin

(10) Patent No.: US 7,992,311 B2
(45) Date of Patent: Aug. 9, 2011

(54) ROTARY BORING TOOL ALIGNMENT AND DEPTH INDICATION SYSTEM

(76) Inventor: John Cerwin, Gurnee, IL (US)

( * ) Notice: Subject to any disclaimer, the term of this patent is extended or adjusted under 35 U.S.C. 154(b) by 169 days.

(21) Appl. No.: 12/426,191

(22) Filed: Apr. 17, 2009

(65) Prior Publication Data

US 2009/0260239 A1   Oct. 22, 2009

Related U.S. Application Data

(60) Provisional application No. 61/045,611, filed on Apr. 17, 2008, provisional application No. 61/050,239, filed on May 4, 2008.

(51) Int. Cl.
*G01B 11/27* (2006.01)
*G01B 11/00* (2006.01)
*B23B 49/00* (2006.01)

(52) U.S. Cl. .................. 33/286; 33/DIG. 21

(58) Field of Classification Search ........ 33/227, 33/263, 278, 279, 280, 626, 638, 642, 644, 33/DIG. 21; 408/16; 356/399, 626, 631
See application file for complete search history.

(56) References Cited

U.S. PATENT DOCUMENTS

| | | | |
|---|---|---|---|
| 2,855,679 A | 11/1955 | Gibble | |
| 2,822,615 A | 9/1956 | Durst et al. | |
| 3,117,480 A * | 1/1964 | Peddinghaus | 83/520 |
| 3,130,633 A * | 4/1964 | Rantsch | 356/144 |
| 3,864,839 A | 2/1975 | Wolf | |
| 4,078,869 A | 3/1978 | Honeycutt | |
| 4,154,001 A | 5/1979 | Serafin | |
| 4,222,175 A | 9/1980 | Bernicky | |
| 4,564,322 A | 1/1986 | Stapley | |
| 4,785,544 A | 11/1988 | Heinsius et al. | |
| 4,968,146 A * | 11/1990 | Heizmann et al. | 356/623 |
| 6,137,579 A * | 10/2000 | Reilley | 356/399 |
| 6,328,505 B1 * | 12/2001 | Gibble | 408/16 |
| 6,342,946 B1 * | 1/2002 | Holstein | 356/152.1 |
| 6,499,219 B1 | 12/2002 | Wightman | |
| 6,565,227 B1 | 5/2003 | Davis | |
| 6,583,869 B1 * | 6/2003 | Sheridan | 356/153 |
| 6,587,184 B2 | 7/2003 | Wursch | |
| 6,681,869 B2 | 1/2004 | Wursch | |
| 6,692,200 B2 | 2/2004 | Peterson | |
| 6,937,336 B2 | 8/2005 | Garcia et al. | |
| 7,164,474 B2 | 1/2007 | Arntson et al. | |
| 7,200,516 B1 * | 4/2007 | Cowley | 702/151 |
| 7,243,440 B2 | 7/2007 | DeKeyser | |
| 7,331,113 B1 | 2/2008 | Patrick et al. | |
| 7,375,361 B2 * | 5/2008 | Turner et al. | 250/559.3 |
| 2004/0093749 A1 | 5/2004 | Wu | |
| 2004/0136795 A1 * | 7/2004 | Chen | 408/16 |
| 2004/0136796 A1 * | 7/2004 | Chen | 408/16 |
| 2005/0132589 A1 * | 6/2005 | Johnson | 33/286 |
| 2007/0030486 A1 * | 2/2007 | Gelbart | 356/399 |
| 2007/0065242 A1 | 3/2007 | Skradski et al. | |

FOREIGN PATENT DOCUMENTS

| | | |
|---|---|---|
| DE | 2838968 | 3/1980 |
| DE | 4336730 A1 * | 5/1995 |
| JP | 2002-205285 | 7/2002 |

* cited by examiner

*Primary Examiner* — R. Alexander Smith

(74) *Attorney, Agent, or Firm* — Christopher Wood; Daniel Eisenberg; Premier Law Group, PLLC

(57) ABSTRACT

A system for a rotary boring tool that enables a user of the tool to align the tool perpendicularly with respect to a work surface of a work piece. In one embodiment the system enables a user to gauge distance or depth drilled into the work piece.

10 Claims, 28 Drawing Sheets

ROTARY BORING TOOL ALIGNMENT AND DEPTH INDICATION SYSTEM

CROSS-REFERENCE TO RELATED APPLICATIONS

This application claims the benefit of priority from U.S. Provisional Patent Application Ser. No. 61/045,611 (filed Apr. 17, 2008) and 61/050,239 (filed May 4, 2008). The contents of Provisional Patent Application Ser. Nos. 61/045, 611 and 61/050,239 are incorporated in their entirety herein by reference.

STATEMENT REGARDING FEDERALLY SPONSORED RESEARCH OR DEVELOPMENT

Not Applicable.

FIELD OF THE INVENTION

This invention is directed to rotary boring tool alignment and depth indication systems.

BACKGROUND OF THE INVENTION

DIY and even skilled craftsmen and women often experience difficulty in maintaining correct alignment of a rotary boring tool with a work surface such as a work-piece being drilled by a hand-held power drill. Furthermore, DIY and even skilled craftsmen and women often experience difficulty in determining the depth of a rotary boring instrument as it penetrates a work surface such as a work-piece being drilled by the bit of a hand-held power drill.

There is a continuing need for an apparatus that helps a user to maintain correct alignment of a rotary boring tool with a work surface as well as to indicate the depth of the boring instrument or cutting tool.

SUMMARY OF THE INVENTION

A system for a rotary boring tool that enables a user of the tool to align the tool perpendicularly with respect to a work surface of a work piece. In one embodiment the system enables a user to gauge distance or depth drilled into the work piece.

DETAILED DESCRIPTION OF THE INVENTION

This invention is directed to rotary boring tool alignment and depth indication systems.

In one embodiment of the invention a rotary power tool alignment and depth indication system is provided to improve both the functionality and usability of rotary power tools. The system may be used on any type of rotating power tool. This includes, but is not limited to hand held-power drills of all sorts, stationary drill presses, smaller Dremel® drill tools, as well as larger boring devices. Furthermore, the system can be used on other types of rotating machinery such as milling machines and lathes.

Figure 1A:
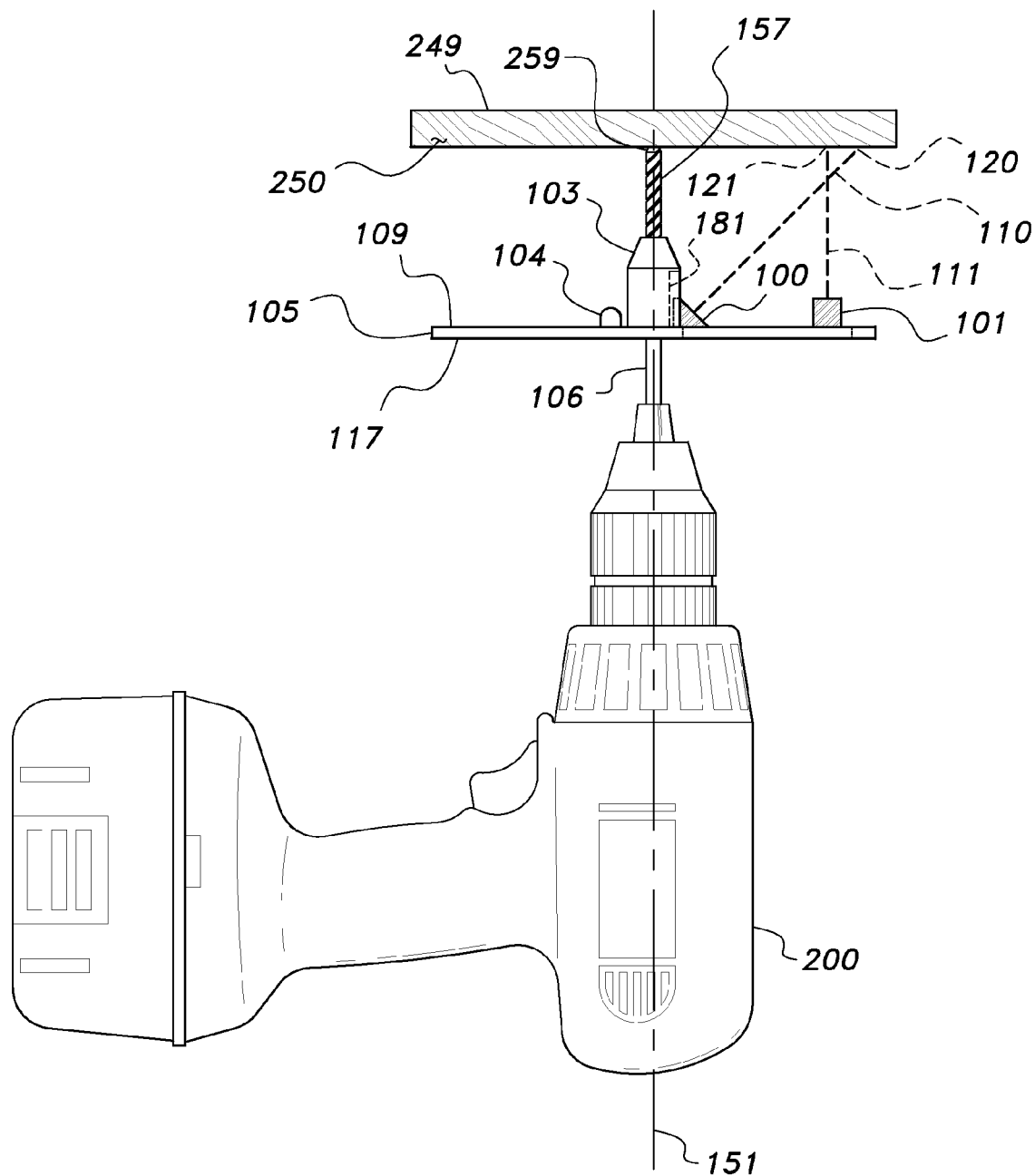
FIGS. 1A and 1B show a first embodiment of the invention.

It will be understood that such terms as "upper and lower", "front and rear", and "top and bottom" are used for convenience to describe relative directional reference in the common orientation of system as shown in FIG. 1A.

For purposes of simplicity, the system embodiments described below are provided in the context of hand-held power drills. It should be noted, however, that the advantages provided by the system are equally applicable to all types of rotary power tools. These advantages include, but are not limited to, visual work surface alignment, visual drill bit or cutting tool depth indication, and visual drill bit or cutting tool work surface positioning.

In one embodiment (see FIGS. 1A and 1B), the system comprises of first and second light sources 100 and 101, a cutting tool holder such as, but not limited to, a chuck 103, and a power source 104. In this embodiment the first and second light sources 100 and 101, and power source 104 are mounted on a body 105 such as a circular disk, with the first and second light sources 100 and 101 essentially inline with the center position of the chuck 103. The body 105 is shown in FIG. 1A connected (either permanently or temporarily) to the power drill 200 so that the rotational output of the drill is translated to the body 105, which then rotates as well. When a drill bit is attached to the system chuck 103, the drill and the system can be used in unison to provide improved drilling and boring operations. The power drill 200 defines a longitudinal axis 151 that passes through the rotary parts of the power drill 200 which in FIG. 1A includes chuck 103 a shaft 106, and a drill bit 157 extending from chuck 103. In FIG. 1A the body 105 is mounted in a transverse plane (i.e., at a 90° angle) with respect to the longitudinal axis 151. The body 105 defines a top surface 109, a bottom surface 117, and a circumference 119. It should be understood that the chuck 103 can be any suitable cutting-tool holder such as a connector able to secure the drill bit 157 to the rotary tool such as a power drill 200.

Visual Work Surface Alignment

With regards to proper work surface alignment, the system allows a power drill user to quickly visualize if the drill is aligned (both vertically and horizontally) with a work surface 250 of a work piece 249. This is important because proper horizontal and vertical alignment will provide for a bore-hole that is completely perpendicular to the work surface. Furthermore, the system is advantageous because it does not rely on gravity, so the orientation of the work surface is inconsequential.

Figure 1B:
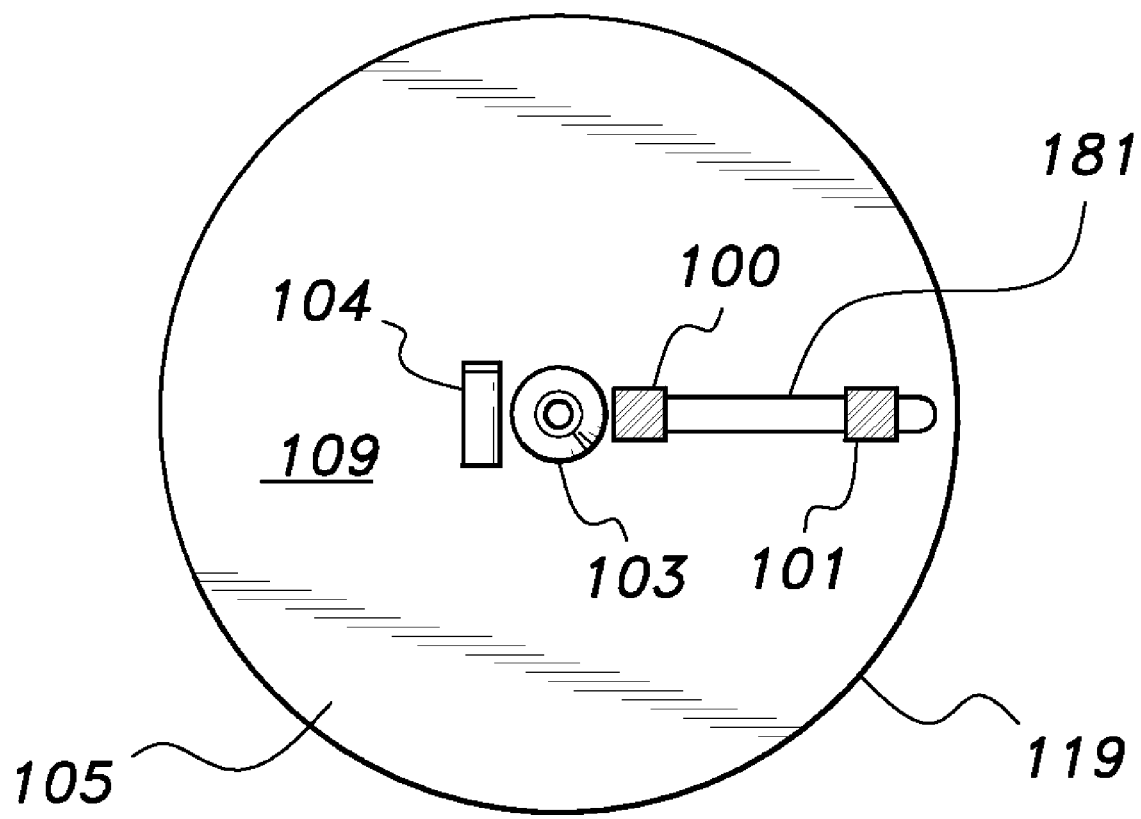

In the embodiment pictured in FIGS. 1A and 1B, the system produces two essentially circular visible projections on a work surface 250 that provide a visual indication of drill alignment or misdirection. More specifically, first and second light sources 100 and 101 respectively project inner and outer concentric circles of light 130 and 131 (see FIGS. 2A through 2C) on the work surface 250 when the power drill 200 is being held at a perpendicular angle with respect to the work surface 250. These laser projections are created by the rotation of the embodiment in conjunction with the rotating portion of the power drill 200.

Figure 2A:
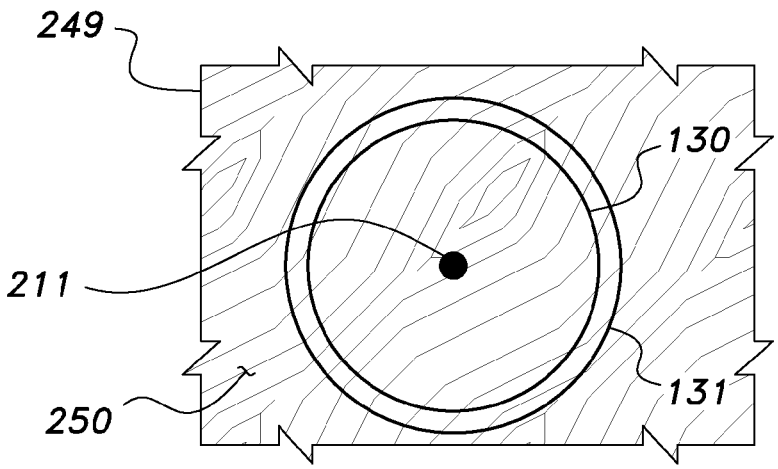
FIGS. 2A through 2C show visible projections on the surface of a work piece according to one aspect of the invention.
Figure 2B:
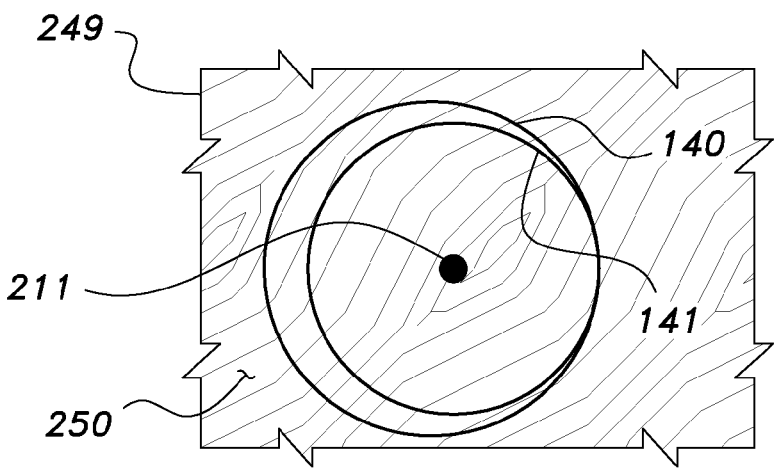
Figure 2C:
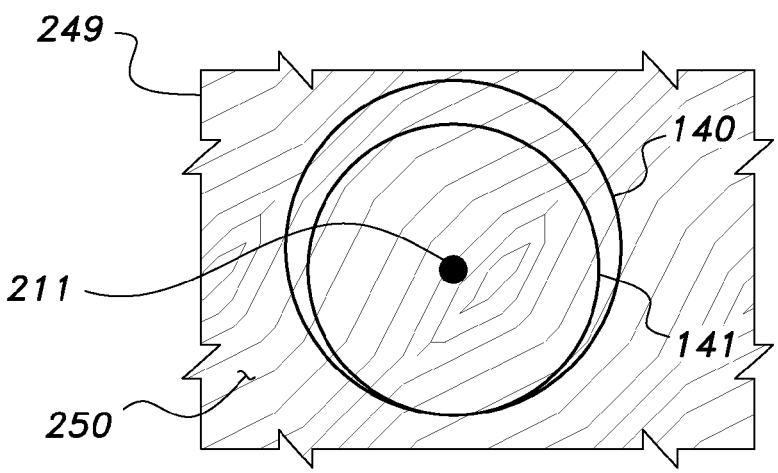

In one embodiment of the invention as depicted in FIGS. 2A through 2C, a power drill 200 aligned perpendicular with respect to a work surface 250 produces two visible and essentially concentric circular projections (in FIG. 2A shown as first and second concentric circles 130 and 131) on a work surface 250 with the position of the tip 259 of a drill bit 157 located at the center 211 of the concentric circular projections. More specifically, first and second light sources 100 and 101 respectively produce first and second light beams 110 and 111, which in turn respectively project first and second visible projections 120 and 121 on the work surface 250, which upon rotation of the system in turn respectively generate first and second concentric circle projections 130 and 131 onto the work surface 250 when the power drill 200 is aligned perpendicularly with respect to the work surface 250. Conversely, a rotary boring tool such as, but not limited to, a power drill 200 that is misaligned with regards to the work surface 250 (also pictured in FIGS. 2B and 2C) produces first and second non-concentric (non-centered) circles 140 and 141. These non-concentric circles may also contain some elliptical distortion. The combination of these factors makes it easy for a power drill user (i.e., power drill operator) to visualize and quickly correct for any drill misalignment.

In this embodiment, first light source 100, which may be a laser, LED, or other light source, produces a first light beam 110 that is at an acute angle of, for example, 45 degrees to the drill bit 157. When the embodiment is not rotating, the first light beam 110 from first light source 100 produces a first visible projection 120 on the work surface 250. Second light source 101 (which may also be a laser, LED or other light source) produces a second light beam 111 that is parallel to the longitudinal axis 151 and hence parallel to the illustrated drill bit 157. When the embodiment is not rotating, the second light beam 111 from second light source 101 produces a second visible projection 121 on the work surface 250.

The first and second visible projections 120 and 121 are typically, but not necessarily, dot-shaped. For example, the first and second light sources 100 and 101 can optionally include, or are operatively coupled to, one or more lenses that manipulate the light output from the light sources to provide visible projections that are not regular dot-shaped. Such manipulations can include, but are not limited to projection shaping or focusing. The first and second light sources 100 and 101 could, for example, be laser light sources that incorporate one or more diffractive optical elements (DOEs). DOEs are described, for example, in U.S. Pat. Nos. 5,151,917, 4,846,552 and 4,895,790. U.S. Pat. Nos. 5,151,917, 4,846,552 and 4,895,790 are incorporated herein by reference in their entirety.

Figure 3A:
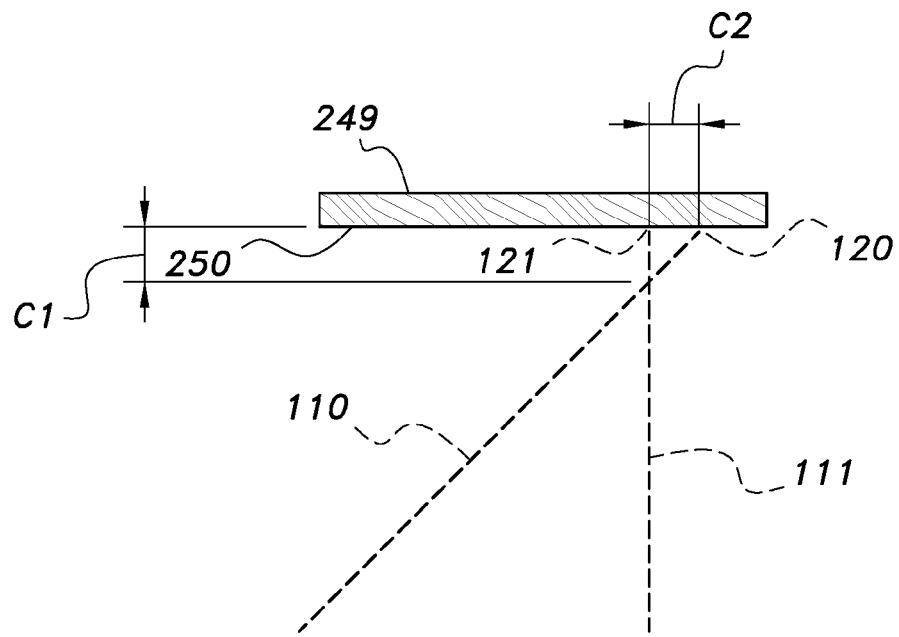
FIGS. 3A and 3B respectively show the result of correct and incorrect alignment with respect to a work surface according to one embodiment of the present invention.

In this embodiment when the power drill 200 is aligned correctly against a work surface 250, the work surface 250 becomes the third leg of a right angle triangle. As depicted in FIG. 3A the first and second light beams 110 and 111 combine with the work surface 250 to create a 45°-45°-90° right angle triangle, with first light beam 110 producing the hypotenuse, second light beam 111 producing the c1 leg, and the work surface 250 the c2 leg. In this non-limiting example, the c1 leg is equal in length to the c2 leg, and the first and second dot-shaped visible projections 120 and 121 form the end points of leg c2.

Figure 3B:
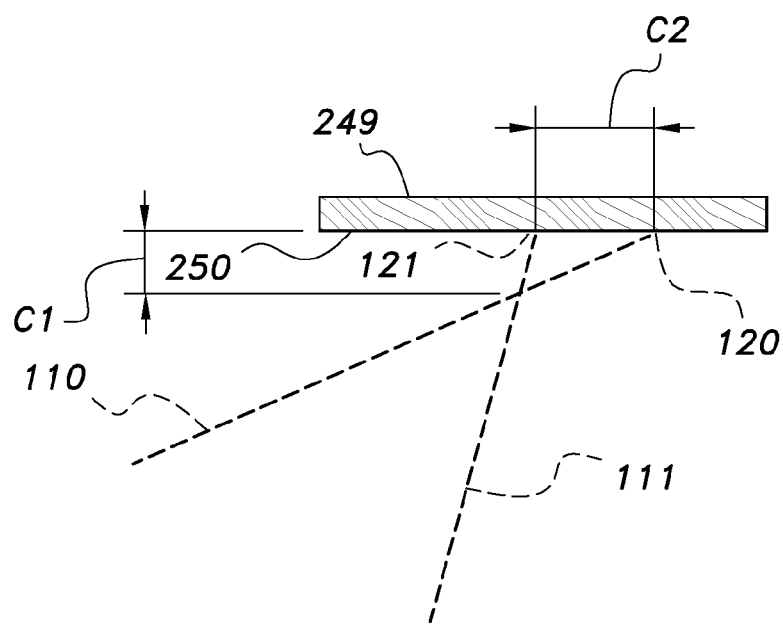

When this embodiment is aligned perpendicularly against a work surface 250 and rotating with the output of the power drill 200, the distance between the first and second dot-shaped projections 120 and 121 (the c2 leg), is constant. In correct alignment the first and second light beams 110 and 111 producing first and second dot-shaped projections 120 and 121 respectively produce first and second concentric circle projections 130 and 131 on the work surface 250. Conversely, when the embodiment is misaligned against a work surface 250 and rotating, the distance between first and second dot-shaped projections 120 and 121 (the c2 leg) is different (see FIG. 3B). Since the embodiment is no longer producing a right angle triangle, this produces the effect of two essentially non-aligned, first and second non-concentric (non-centered) circles 140 and 141.

In another embodiment, the position of one or more of the light sources can be altered with reference to their linear distance from each other and the longitudinal axis 151. This has the effect of changing the distance between the first and second visible projections 120 and 121 (the c2 leg length) on the work surface 250, and thus the diameter of the first and second concentric circles 130 and 131. Such an adjustment is optimal for drill bits of different lengths and/or for the configuration of different visual alignment effects. FIGS. 4A through 4D presents the latter—an example of a different type of visual alignment with regards to a work surface 250. In this example, first light source 100 is positioned so that its first circular projection 130 is equal in diameter to that of the second circular projection 131 from light source 101 when the drill bit 157 is aligned perpendicularly with the work surface 250.

Figure 4A:
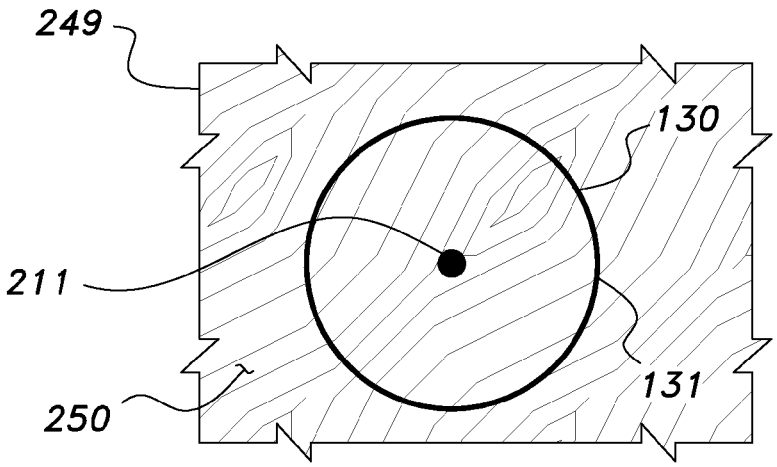
FIGS. 4A through 4D show the result of correct and incorrect alignment with respect to a work surface according to another embodiment of the present invention.
Figure 4B:
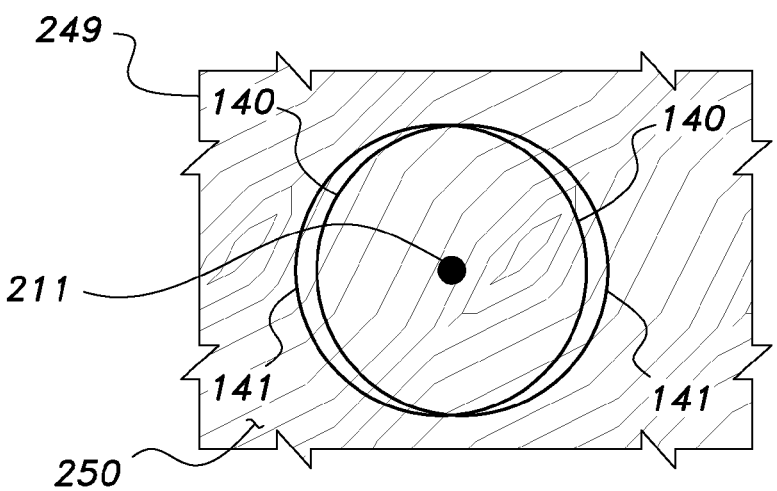
Figure 4C:
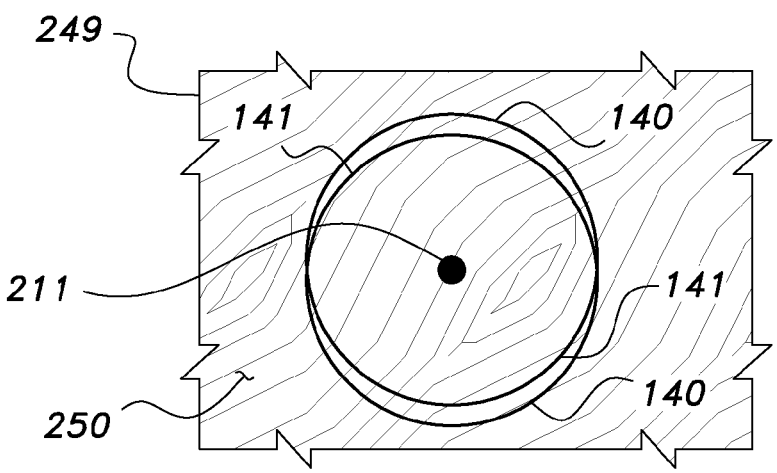

As depicted in FIG. 4A, perfect alignment is indicated by the overlapping of the two projections 130 and 131. Conversely, any misalignment is indicated by a deviation in shape or position of the first and second non-concentric circles 140 and 141. This embodiment and others may also include the optional use of different colored lights so as to differentiate between the two projections. An example would be a red light 100 and a green light 101.

Figure 4D:
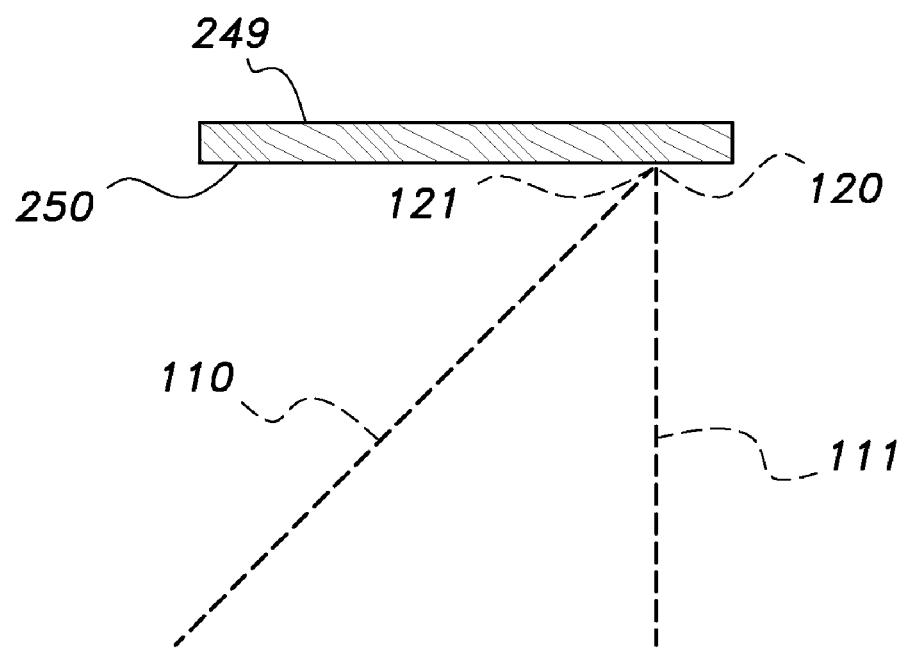

Referring specifically to FIGS. 4A and 4D, to ensure that the first beam 110 produces first circle 130 that coincides on the work surface 250 with second circle 131 produced by the second beam 111 the angle of the first beam of light 110 from first light source 100 can be adjustable such that the first beam 110 produces a circle of light on the work surface 250 that coincides with the circle of light provided by the second light source 101 (see FIG. 4D).

Figure 5A:
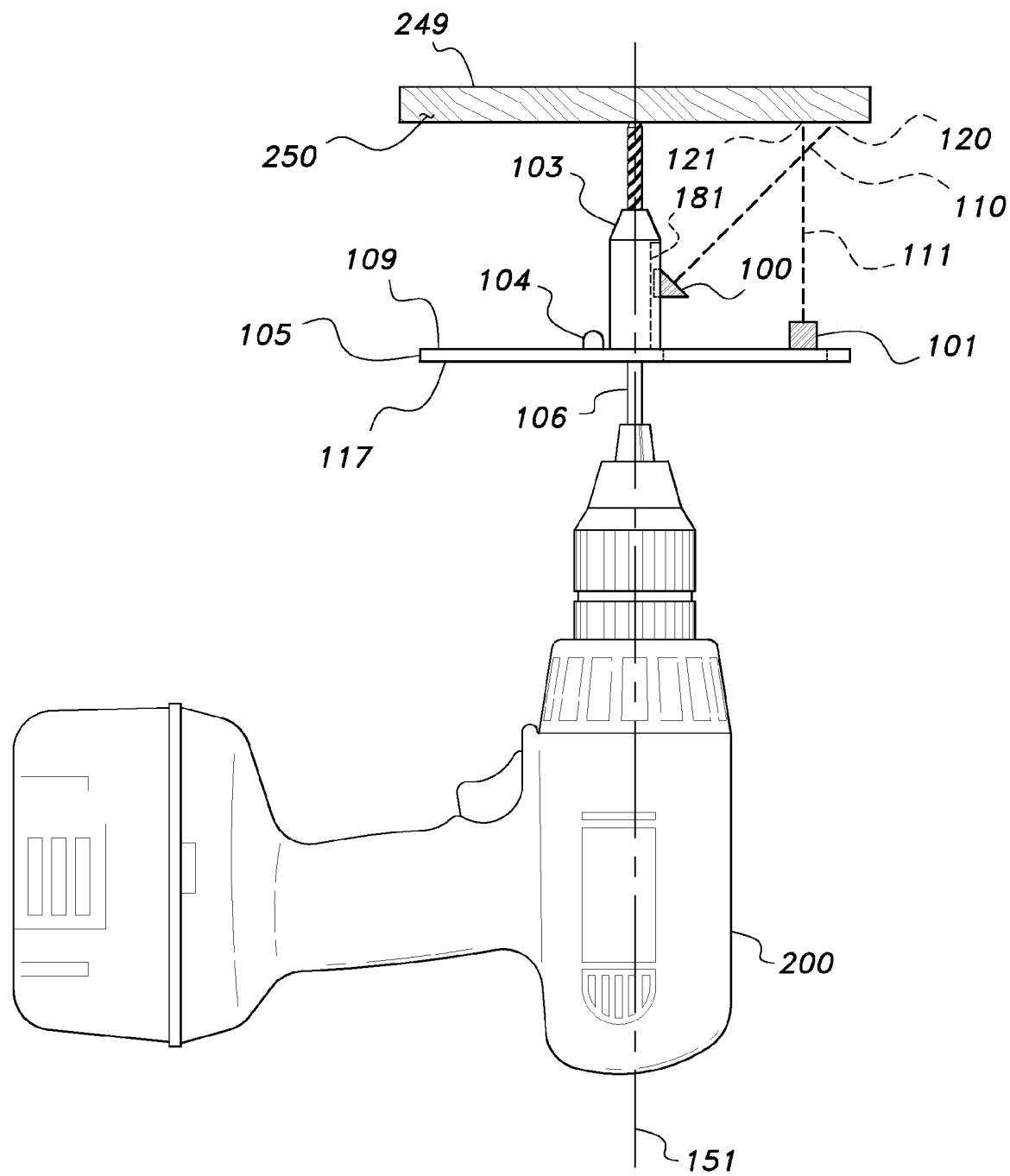
FIGS. 5A and 5B show how a first light source can be adjusted in the vertical plane with respect to a cutting tool holder in the form of a chuck.

In one aspect of the invention the first light source 100 can be moved up or down the cutting tool holder, such as chuck 103, by means of, for example, a slot or channel 181 mounted vertically on a chuck 103 (shown, e.g., in FIG. 5A). In this embodiment the first light beam 110 produced by first light source 100 is preferably projected at an acute angle away from the longitudinal axis 151. Channels or slots 181 can also be located on the body 105 such as the top surface 109 of body 105, e.g., see FIG. 11A.

Figure 20:
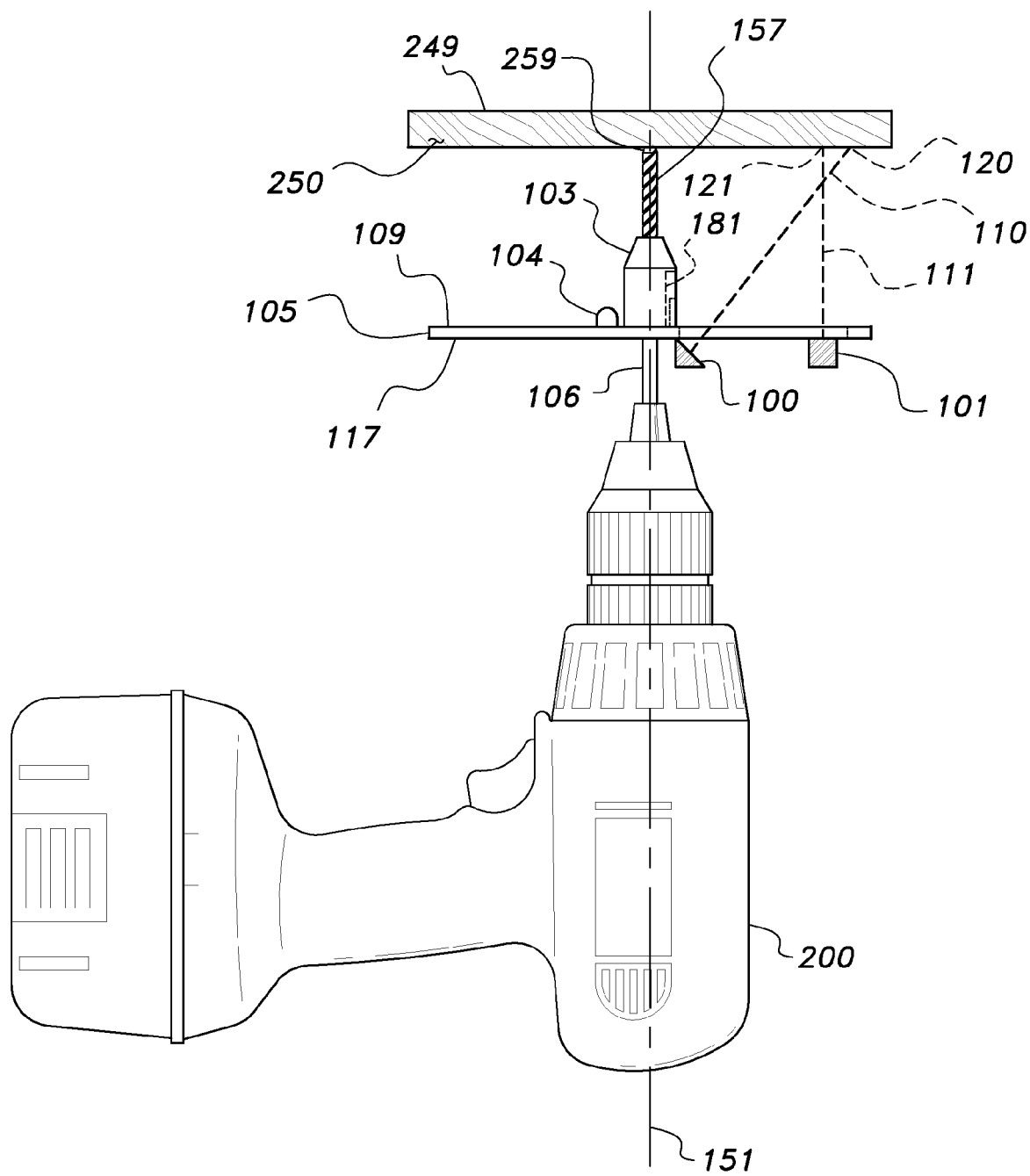
FIG. 20 shows light sources located below a body member (105).

The body 105 can be made of transparent plastic or is substantially transparent to the extent that the body 105 allows passage of light beams sufficient for a human eye to detect visible projections such as 120 and 121. For example, body 105 can be transparent to first and second light beams 110 and 111 thereby allowing the corresponding light sources to be located on the bottom surface 117 of body 105. FIG. 20 illustrates a body 105 sufficiently transparent to allow passage of first and second light beams 110 and 111 through the body member such that first and second light sources 100 and 101 are located on the bottom surface 117 of body 105. The light sources can, if preferred, be at least partly located inside the body 105 or located inside the body 105 as shown, for example in FIG. 21 to give a flush or substantially flush fit with respect to body 105.

Figure 5B:
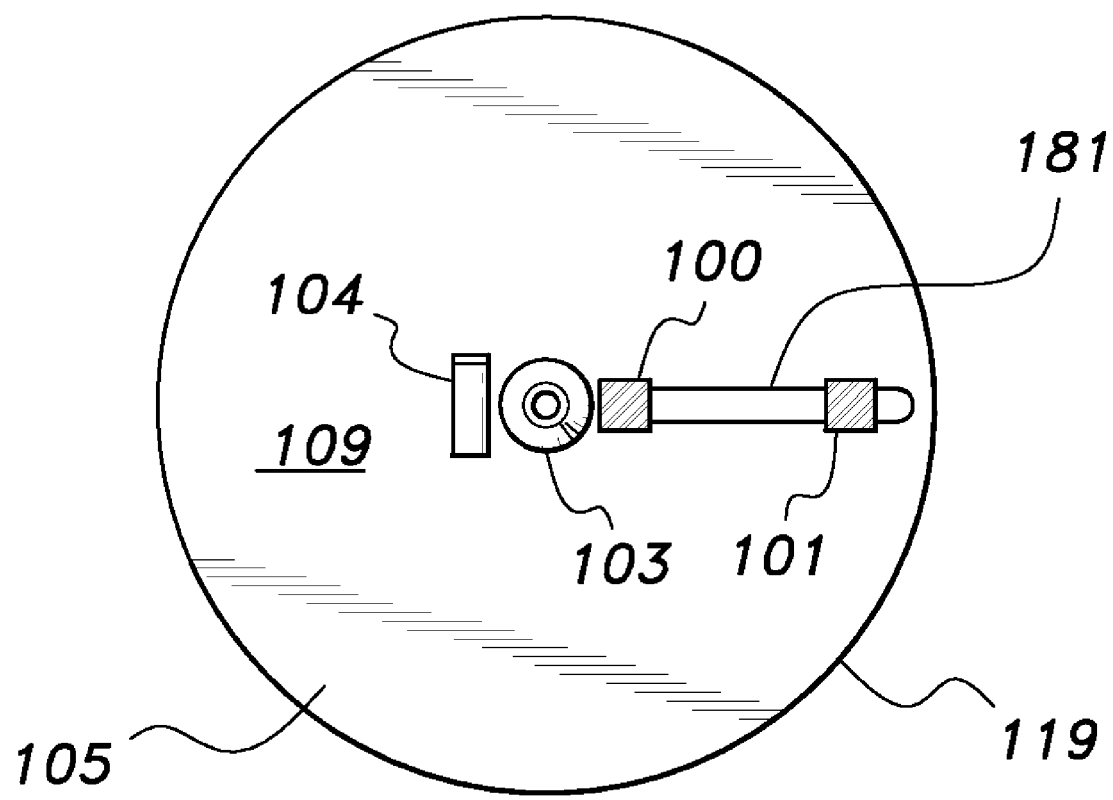

Selectively changing or adjusting the positions of one or more of the light sources has the effect of changing the distance between the first and second visible projections 120 and 121 (the c2 leg length), and thus the diameter of the circles when the system is rotating with the drill. For example, first light source 100 can be adjusted along the longitudinal axis 151 with respect to chuck 103 or body 105 (see FIGS. 5A and 5B). A slot, groove or track can be attached or integrated into the cutting tool. For example, FIGS. 1A and 5A show a slot 181 in vertical orientation and integrated into chuck 103. By moving or positioning the first light source 100 at different points along slot 181 with respect to chuck 103 this has the effect of changing the position of first visible projection 120 on a work surface 250, and thus the diameter of the first circular projection 130 that is produced when the system is rotating with the drill.

Figure 6A:
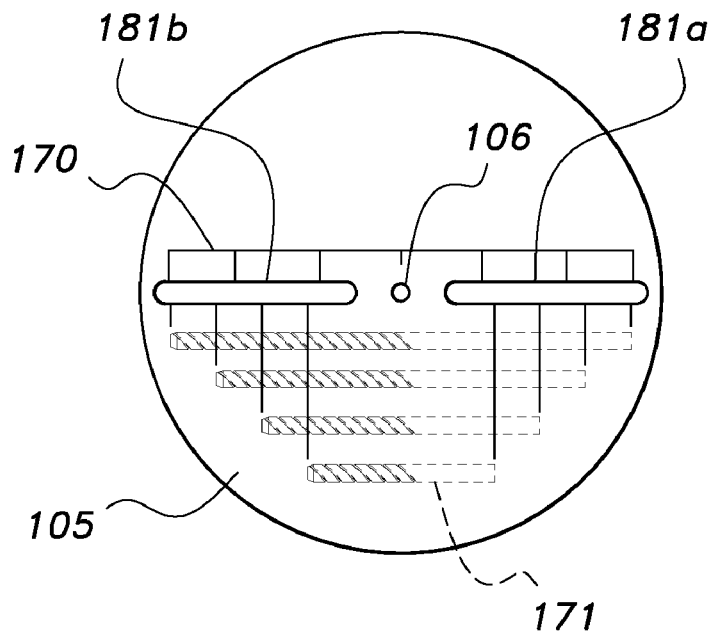
FIGS. 6A and 6B show markings on a body (105) according to one aspect of the invention.
Figure 6B:
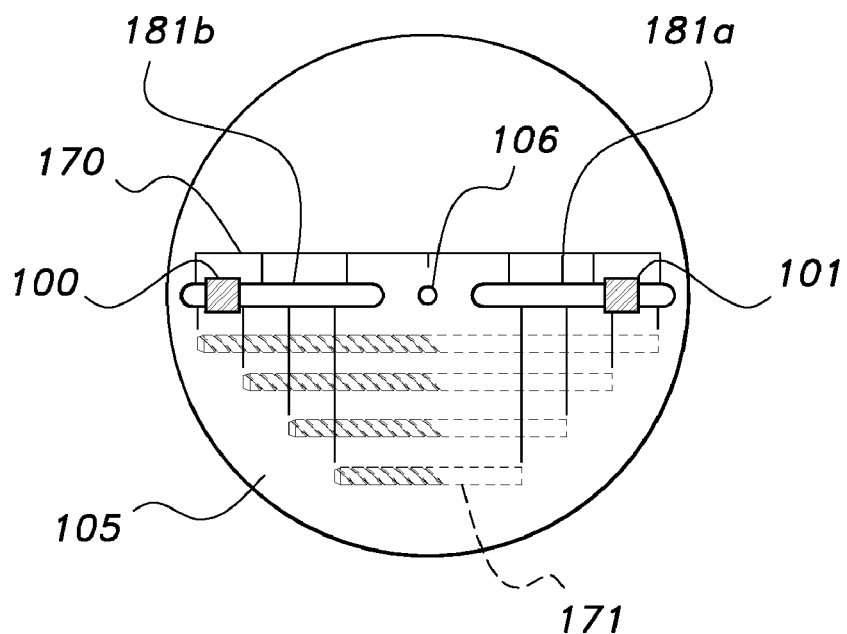

In another embodiment (FIGS. 6A and 6B), the body 105 may have markings and/or indicators that provide the user with guidance on how to position the adjustable lights for different types of operations and drill bit lengths. The markings could include, but are not limited to incremental points in a linear pattern 170 (similar to a ruler), or even drill bit images 171 that provide a user with an easy system setup or guidance mechanism. For example, the markings could inform a user where to position the light sources to obtain overlapping circles, as depicted in FIG. 4A, with respect to a drill bit of a selected length.

Figure 21:
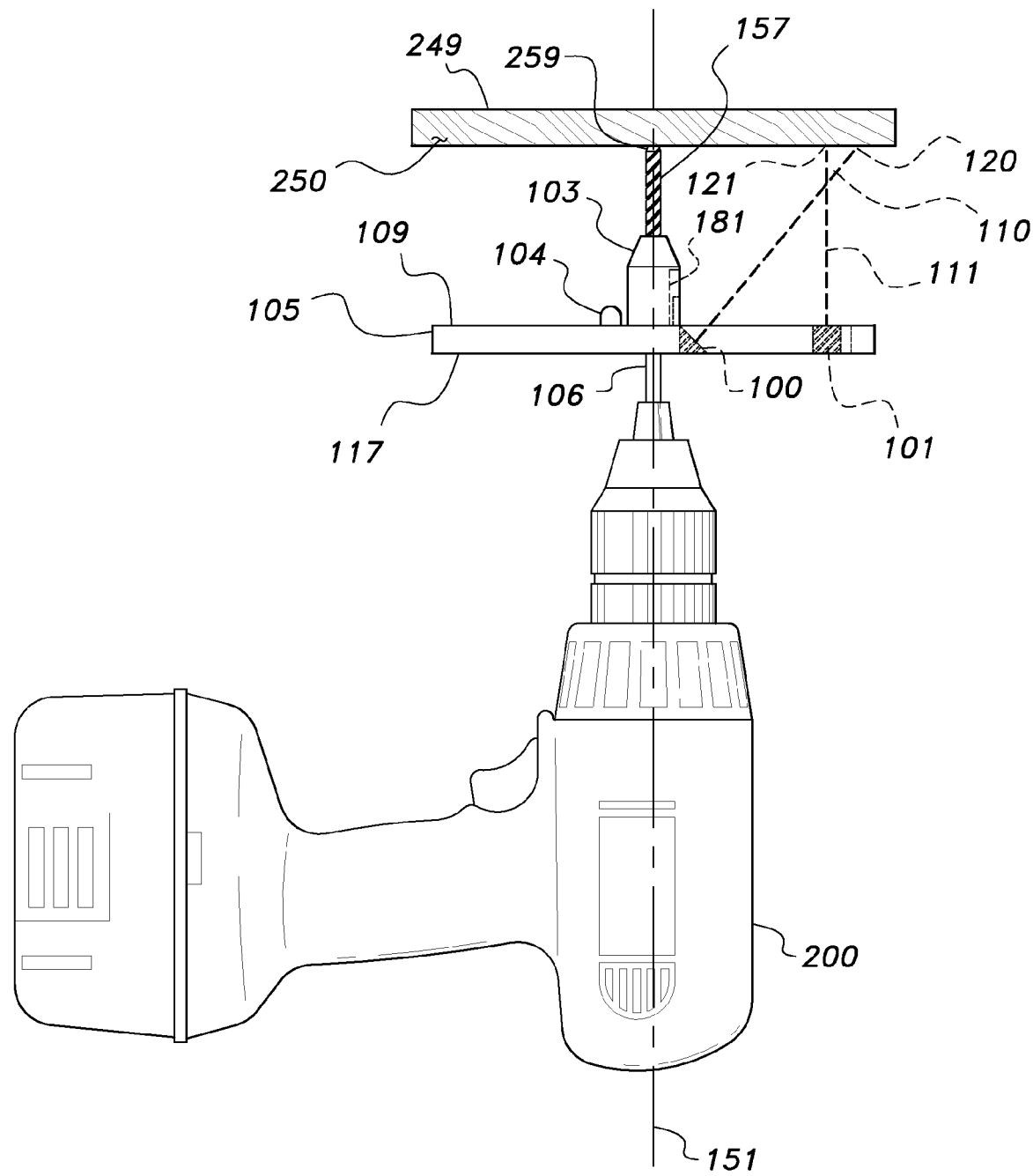
FIG. 21 shows light sources integrated into a body member (105).
Figure 22:
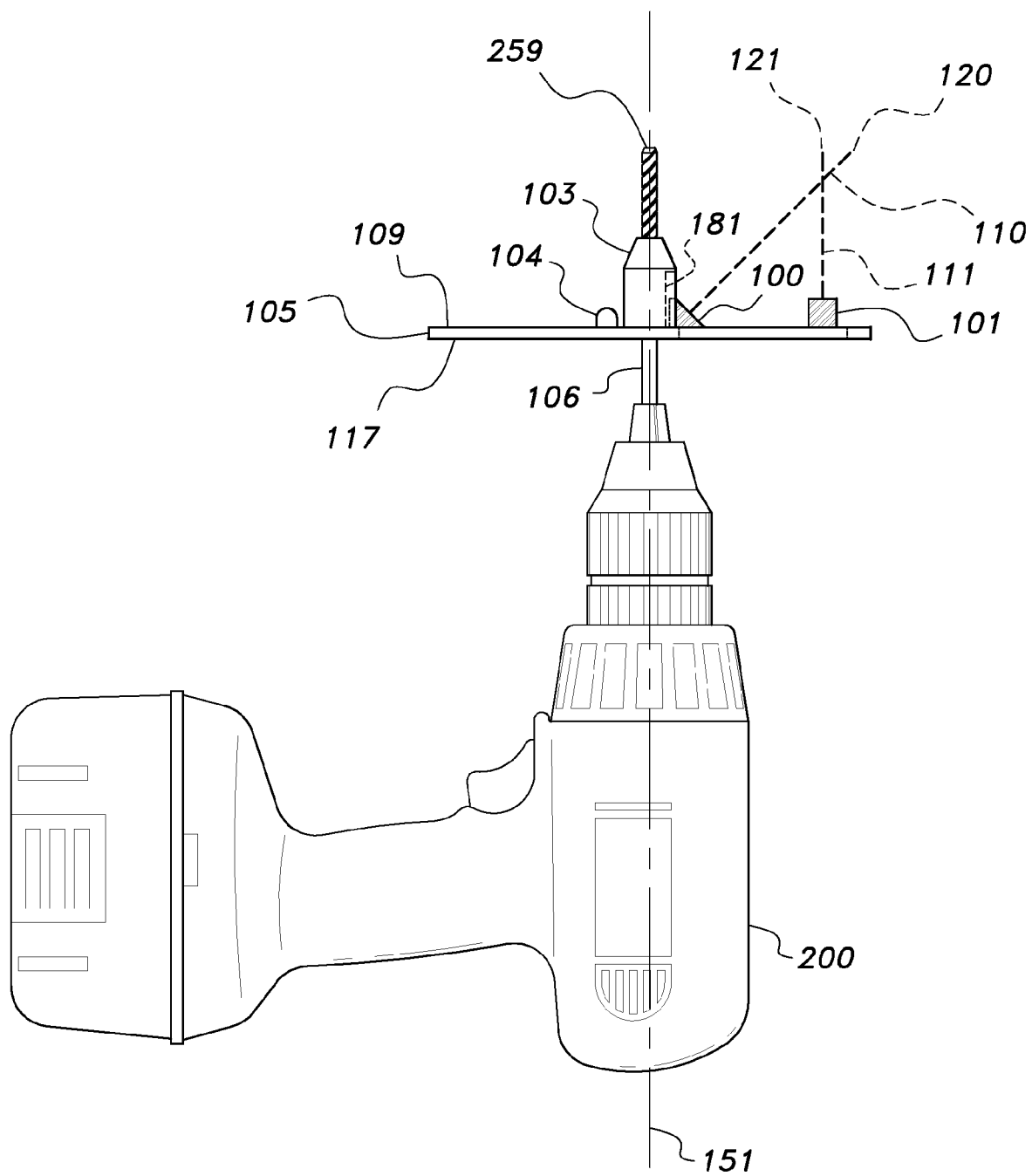
FIG. 22 shows a power drill modified according to an aspect of the invention.

In another embodiment (FIGS. 14A and 14B), first and second light sources 100 and 101 are positioned (either fixed or adjustably) on opposite sides of a cutting tool holder—shown as chuck 103. This allows for the use of longer drill bits, and/or for a body 105 that can be reduced in size, e.g., reduction in the diameter of the body 105. Furthermore, since the light sources are more evenly distributed on the body 105, this embodiment provides for more stability while rotating. The first and second light sources 100 and 101 can be moved along slots 181 (generally denoted by "181", but if more than one slot then represented by derivatives of "181", e.g., labels "181a" and "181b"). It should be understood that the slots can take any suitable form such as, but not limited to: tracks, grooves or channels; also, the light sources can be located in inside the body 105 as shown in FIG. 21 thereby rendering the light sources flush or substantially flush with respect to the top 109 and/or bottom surface 117 of the body 105.

Figure 14A:
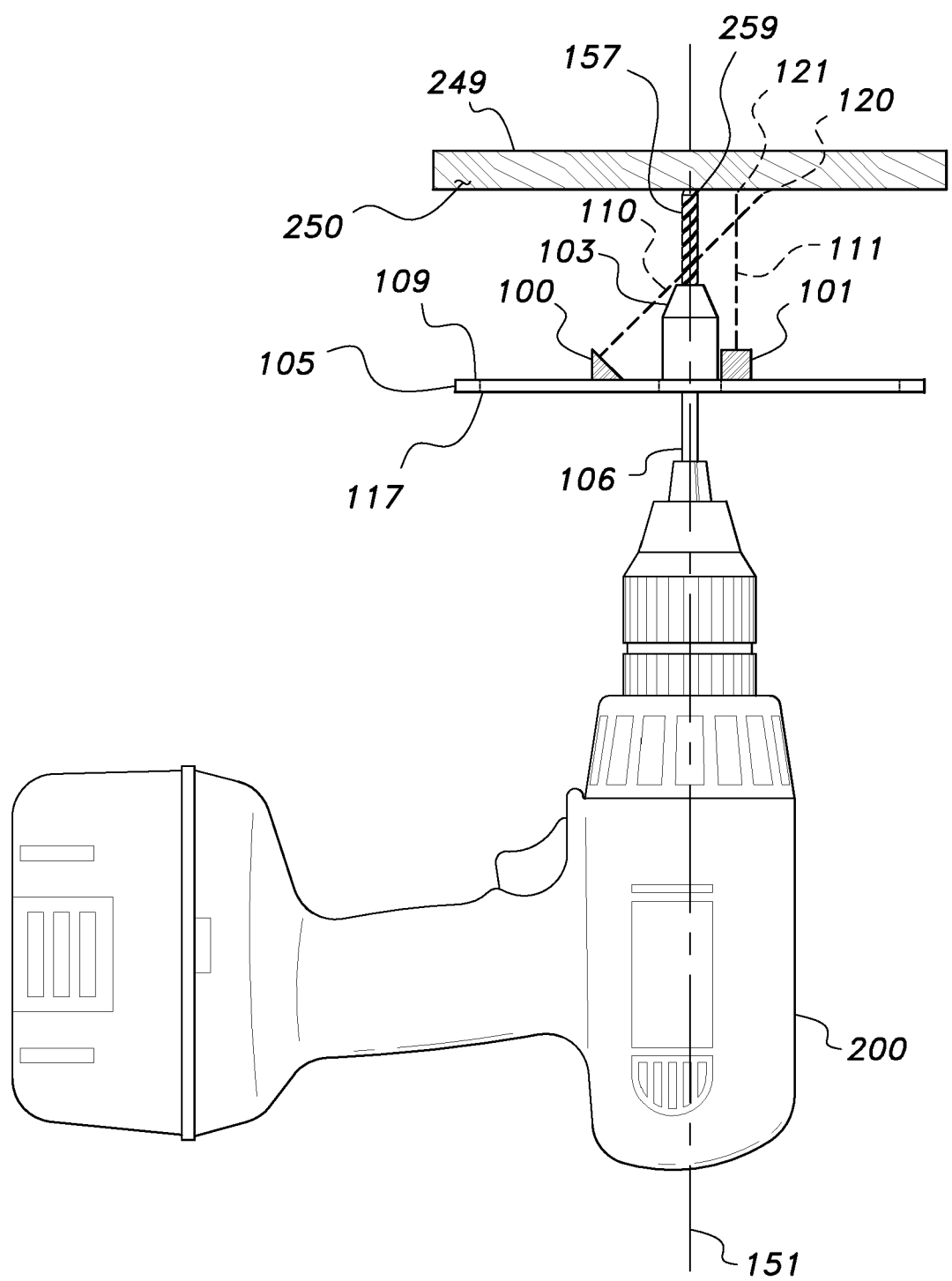
FIGS. 14A and 14B demonstrate the use of first and second light sources located on opposite sides of a cutting tool holder according to the invention.
Figure 14B:
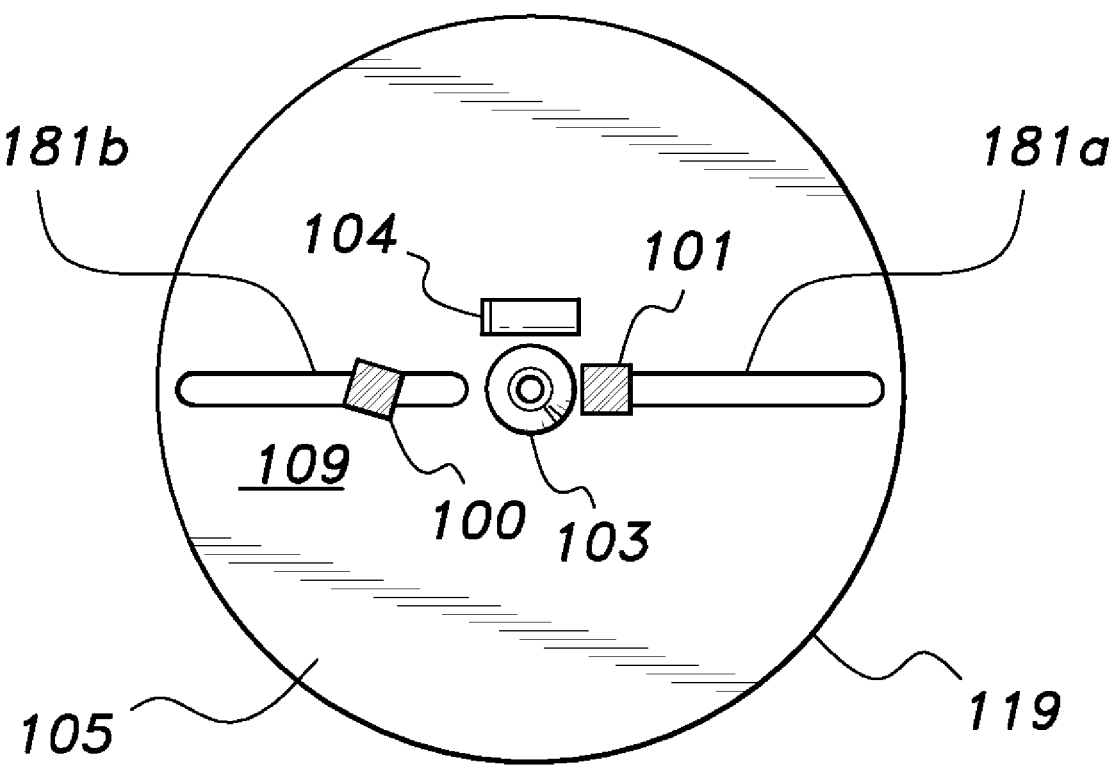

The embodiment pictured in FIGS. 14A and 14B has a first light source 100 that produces a first light beam 110 that is at a 45 degree angle (or close to a 45 degree angle) to the drill bit 157 and longitudinal axis 151, and a second light source 101 that produces a second light beam 111 that is essentially parallel to the drill bit and longitudinal axis 151. In this embodiment the light source 100 or first light beam 110 can be modified so that the first visible projection 120 is visible on the work surface 250 (and not the drill bit 157). For example, the first light source 100 could be rotated in the transverse plane with respect to the longitudinal axis 151 by an amount just sufficient so that the first light beam 110 misses or substantially misses or at least partly avoids the drill bit 157 and be projected onto the work surface 250. FIG. 14B depicts this with a light source 100 that is slightly rotated. Further, the first light source 100 could be manipulated so as to produce a beam that is visible on both sides of the drill bit 157, e.g., via a beam splitter splitting the single beam output of the first light source 100 to pass either side of the drill bit 157. It is preferred that during normal operation of the system that the first and second light beams 110 and 111 combine with a work surface 250 to create a 45°-45°-90° right angle triangle.

Although the preferred embodiment includes a first light source 100 that produces a first light beam 110 that is essentially at an acute angle of 45 degree angle to the drill bit 157 (and longitudinal axis 151), other embodiments may include a light source that is either fixed or adjustable to some acute angle other than 45 degrees. Likewise, although the preferred embodiment includes a second light source 101 that produces a second light beam 111 that is essentially parallel to the drill bit 157 (and longitudinal axis 151), other embodiments may include a light source that is either fixed or adjustable to some angle other than parallel to the drill bit 157 (and longitudinal axis 151).

Visual Drill Bit or Cutting Tool Depth Indication

With regards to drill bit or cutting tool depth indication, the system (i.e., the present invention) optionally provides a power drill user with the ability to quickly visualize the depth of a drill bit as it bores into a work surface. This is important because the power drill user may need to limit or monitor the depth of their drilling operations. This feature may be used in combination with other features, such as work surface alignment.

Figure 7A:
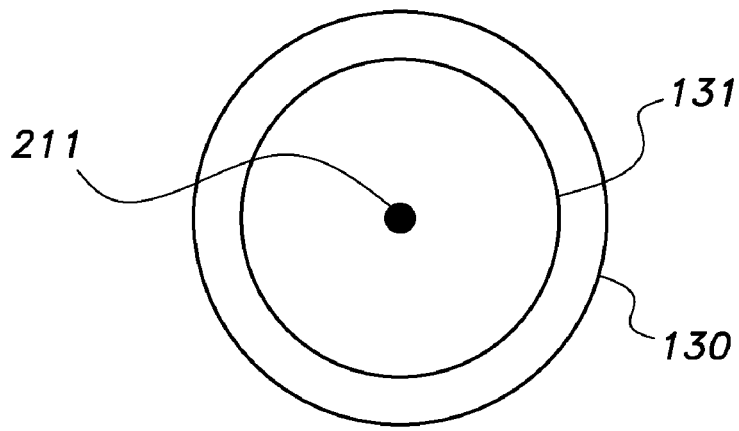
FIGS. 7A through 7C show various circular light projections projected on a work piece surface according to the invention.
Figure 7B:
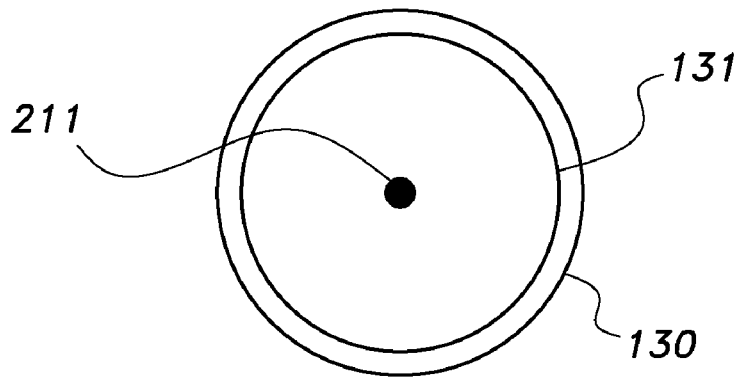
Figure 7C:
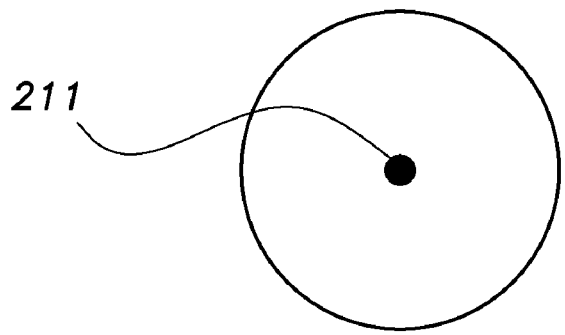

In one embodiment this is accomplished by watching the outer circular laser projection (labeled as "130" in FIGS. 7A and 7B) collapses on the inner circular projection 131 as the drill is pressed forward into the work surface 250. FIGS. 7A through 7C demonstrate what a power drill user will see as the drill 200 is pressed forward into a work surface 250 of a work piece 249. In this embodiment, the outer circular projection 130 collapses on the inner circle 131 and produces a single circle; this indicates that the drill bit has moved forward by the spatial difference between the radius of the first and second circles in the starting position. It should be understood that the work surface 250 of work piece 249 is not limited to a specific work piece.

As depicted in the first embodiment (FIGS. 1A and 1B), an optional feature allows the drill bit depth measurement to be set ahead of time by adjusting the distance between the first and second visible projections 120 and 121 on the work surface 250. Since various embodiments allow the position of first and second light sources lights 100 and 101 to be adjusted, this has the effect of changing the diameter of the first and second circular projections 130 and 131 that are produced when the system is rotating with the drill. Therefore, the starting position of circular laser projection 130 on the work surface may be inside, outside, or equal to that of circular laser projection 131. This provides the power drill user with maximum flexibility.

Figure 8:
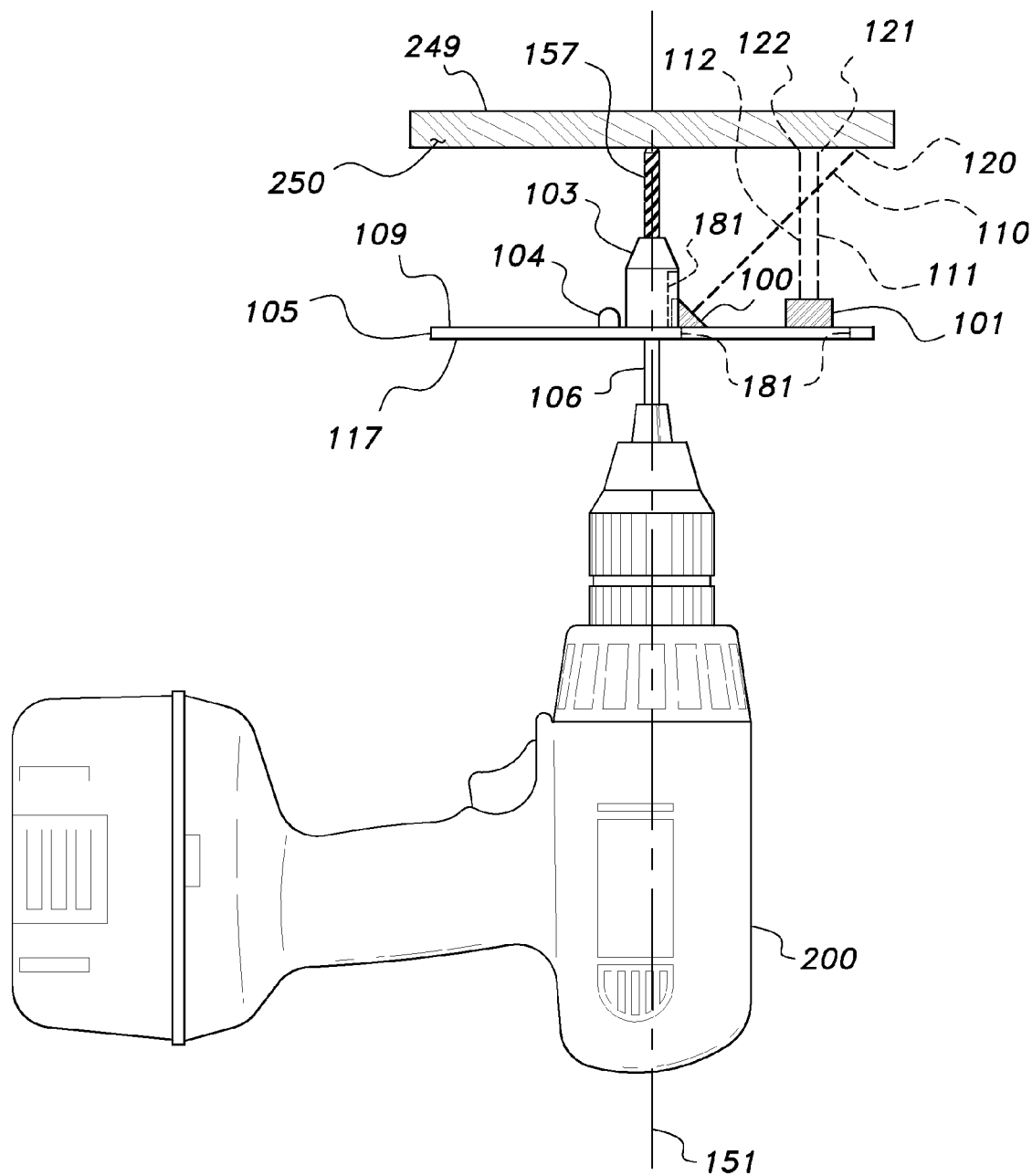
FIG. 8 shows a split beam of light according to the invention.

In another embodiment, second light source 101 may be split by a beam splitter 107 into two or more beams 111 and 112 thus producing visible projections on the work surface 250 in addition to first and second visible projections 120 and 121. An example is depicted in FIG. 8 which shows first, second and third visual projections 120, 121 and 122. In this particular example, the split projections may be further spaced at equal intervals such as a centimeter or inch. When the system is rotating with the rotating parts of the power drill 200, the split beam results in multiple circular projections on the work surface. Such projections provide for the ability to incrementally monitor the progress of a drill bit 157 as it bores into a work surface 250. This effect may also be accomplished through the use of additional light sources like 101 mounted at equal spaced distances in a linear pattern.

Visual Drill Bit or Cutting Tool Work Surface Positioning

The system may also provide methods for a power drill user (i.e. operator) to utilize one or more of the light projections as markers on the work surface 250 to position the drill bit 157 (and thus the location of the bore hole) with regards to elements on the work surface 250 or adjacent surfaces. This positioning ability makes drill bit placement operations more precise, and prevents the need for "pre-marking" the work surface prior to drilling.

For example, if a power drill user is drilling knob holes in a series of identical cabinet doors, the position of the drill bit 157 and more particularly the tip 259 of the drill bit 157 (and thus the location of the associated bore hole) should be identical and consistent on all cabinets. Normally the user would be forced to measure each cabinet, and mark the target borehole position prior to drilling operations.

Figure 9A:
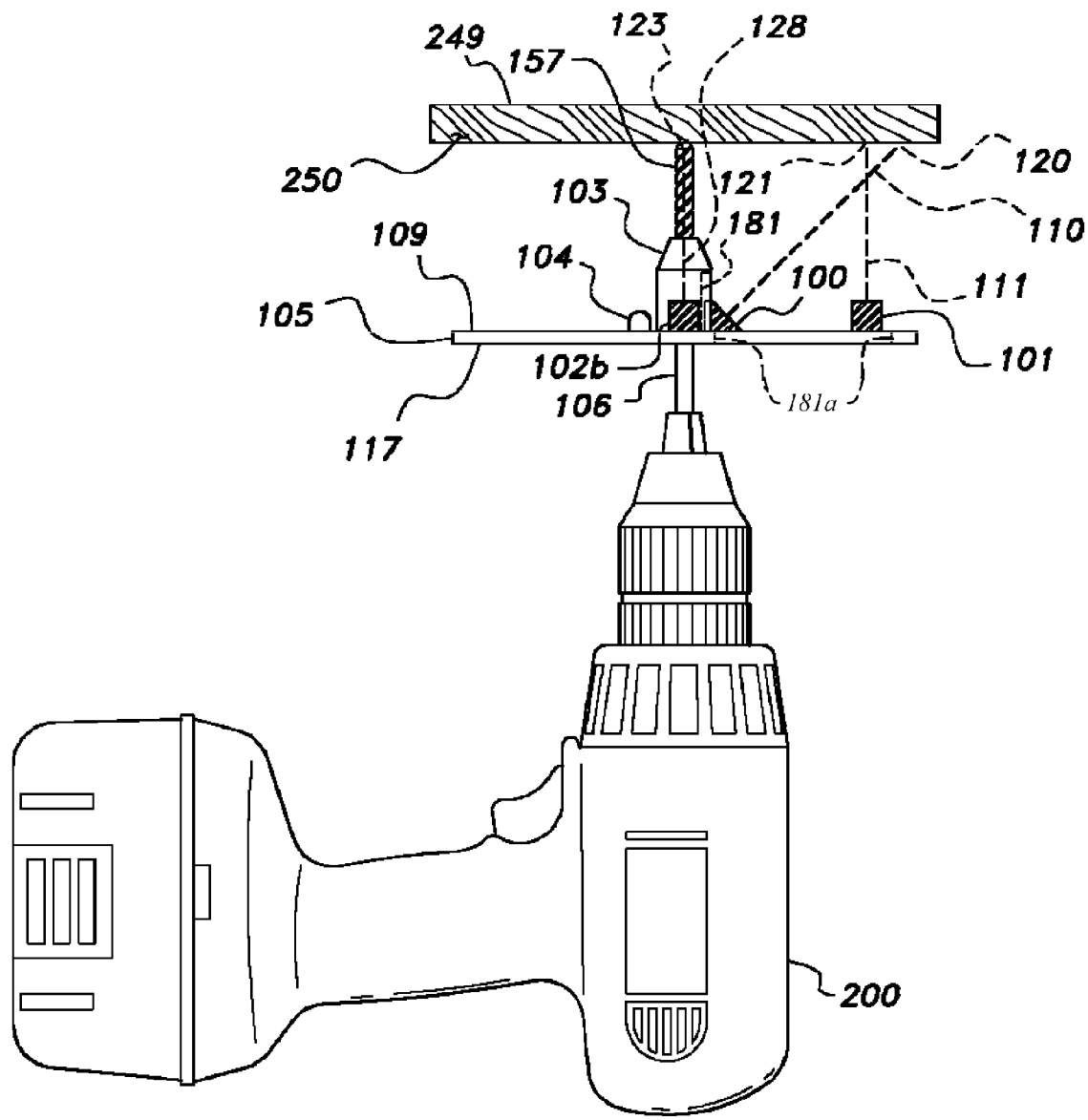
FIGS. 9A and 9B show an additional light source according to the invention.
Figure 9B:
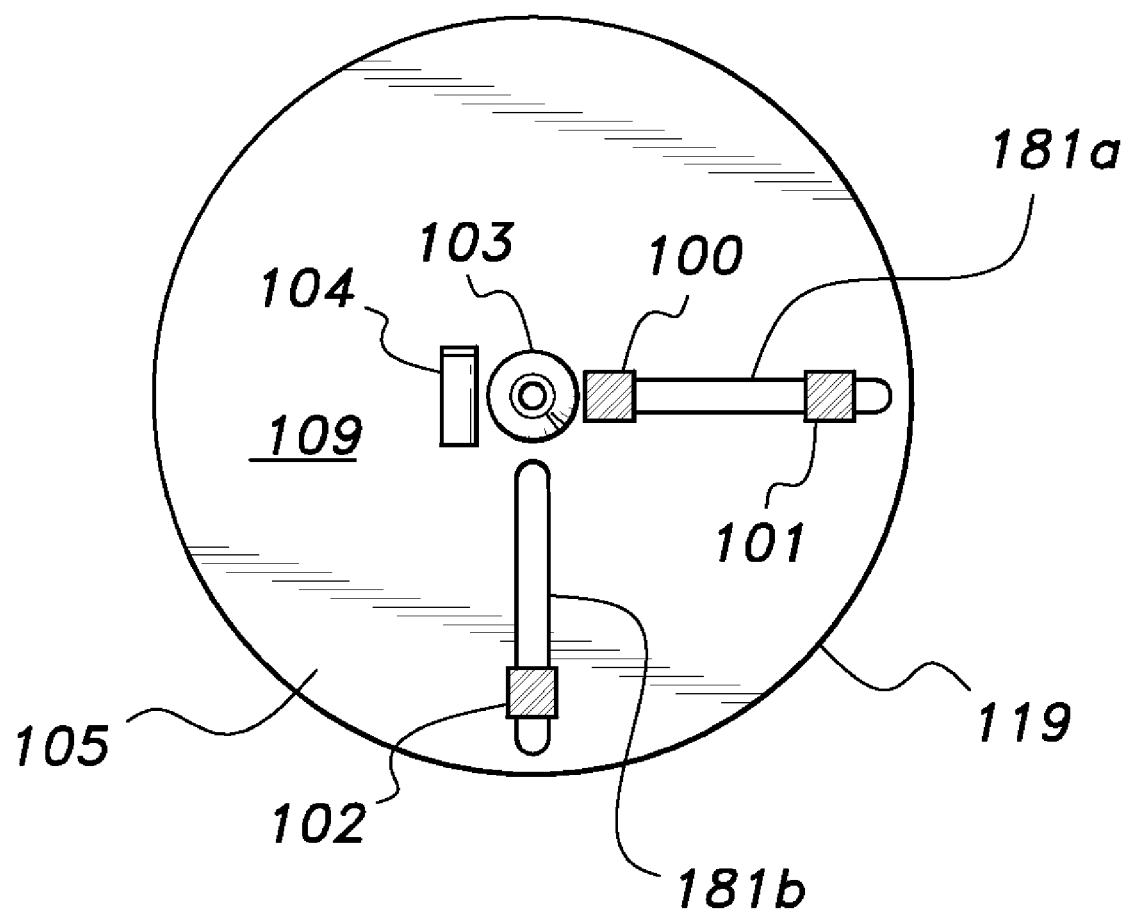
Figure 10:
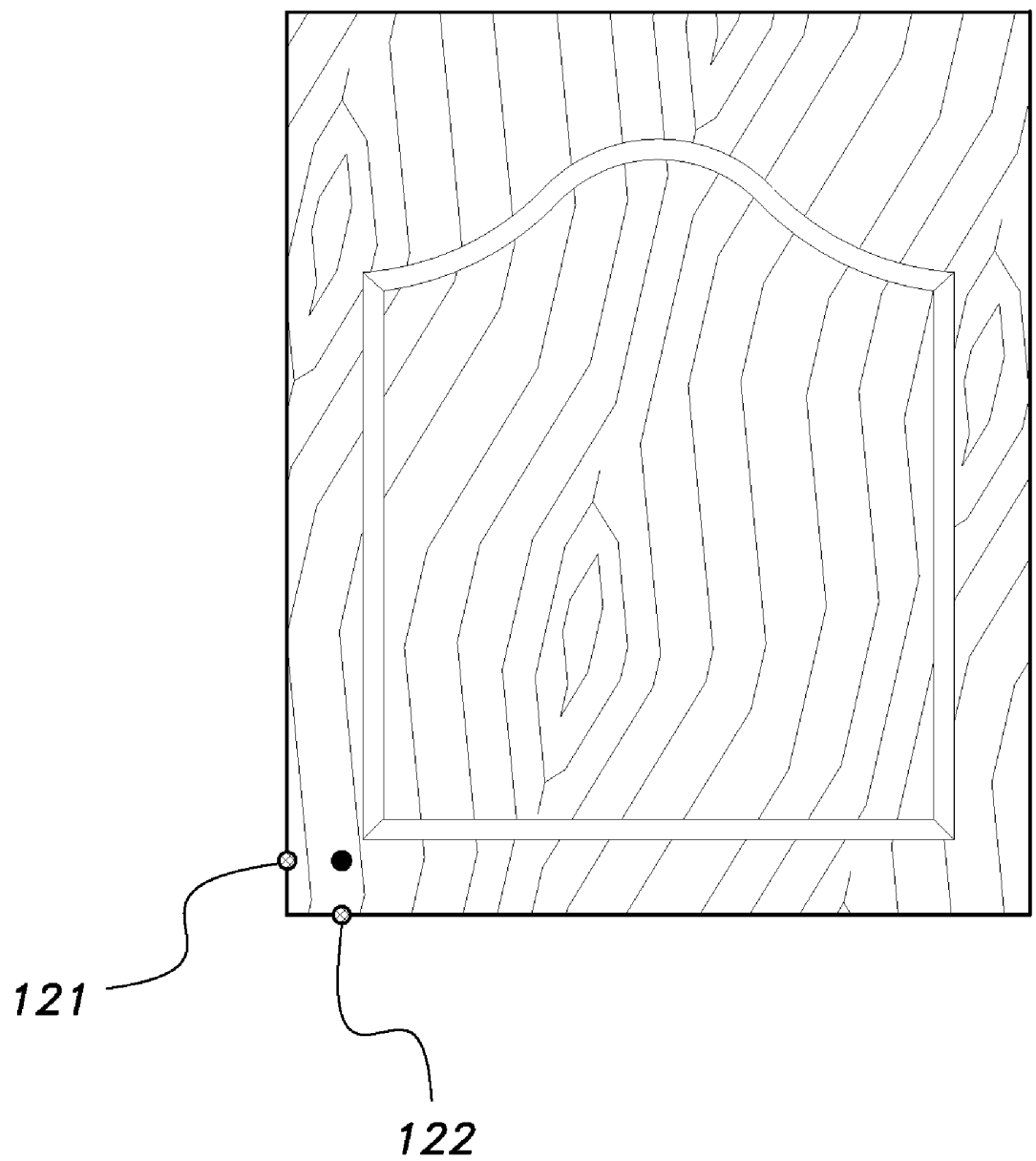
FIG. 10 demonstrates drill tip positioning on a work piece according to the invention.

In one embodiment, one or more additional light sources are added to the system for drill bit positioning on a work surface 250. As depicted in FIGS. 9A and 9B, an optional additional light source 102 is added to the 6 o'clock position on the system body 105 for cabinet (or corner) drilling operations. The additional light source 102b produces third light beam 128, which produces visible projection 123 on the work surface 250. In this configuration, the first and second visible projections 120 and 121, which can be dot-shaped projections, from first and second light sources 101 and 102 can be used to position the drill bit 157 on the work surface with reference, for example to the corner ends of a cabinet. An example of the effect on a cabinet door is pictured in FIG. 10. It should be noted that drill bit work surface positioning is done by manually rotating the system body 105 into the correct orientation with regards to the work surface elements prior to drilling operations. It is also possible in this and other embodiments to turn off first light source 100 if it is not used prior to drilling operations.

Figure 11A:
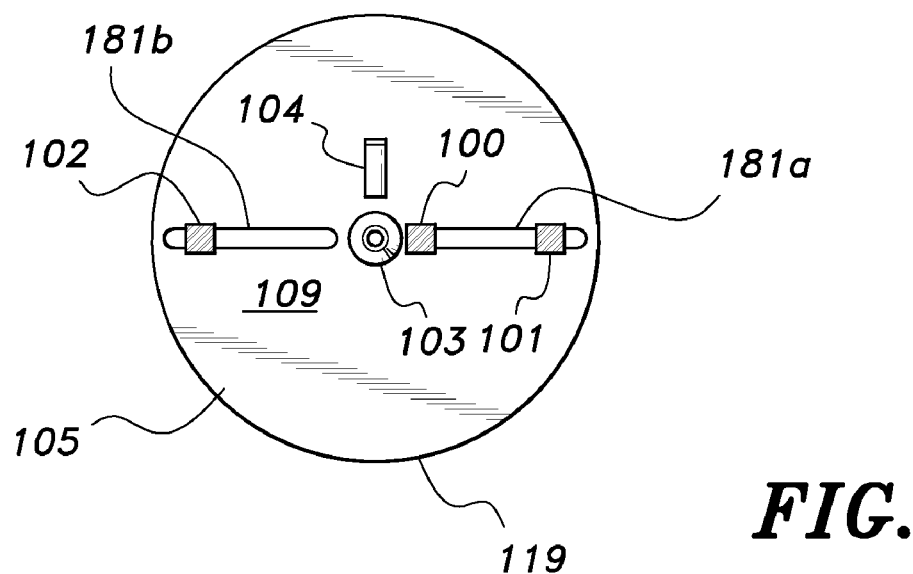
FIGS. 11A and 11B demonstrates drill tip positioning on a work piece according to the invention.
Figure 11B:
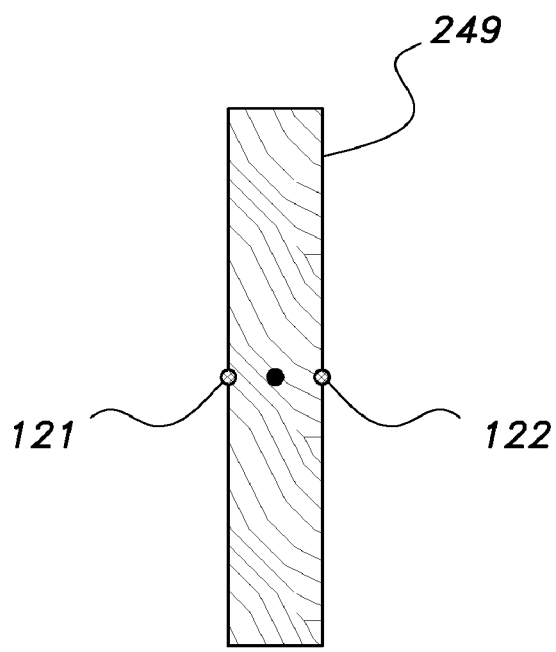

In another embodiment, an optional third light source 102 is added to the mounting body 105 such that the optional third light source 102 is located on the opposite side of chuck or cutting tool holder 103 from second light source 101, wherein second and third light sources 101 and 102 are equidistant from the circumference 119 of the mounting body 105 for centering operations. Such centering operations can be used to quickly find the center of common work surfaces such as wooden studs, deck panels, downspouts, bricks, etc. An example of the system and its effect on a wooden stud is depicted in FIGS. 11A and 11B. In other embodiments, the system may also include additional light sources in the some combination of the 3, 6, 9, and 12 o'clock positions.

Figure 12:
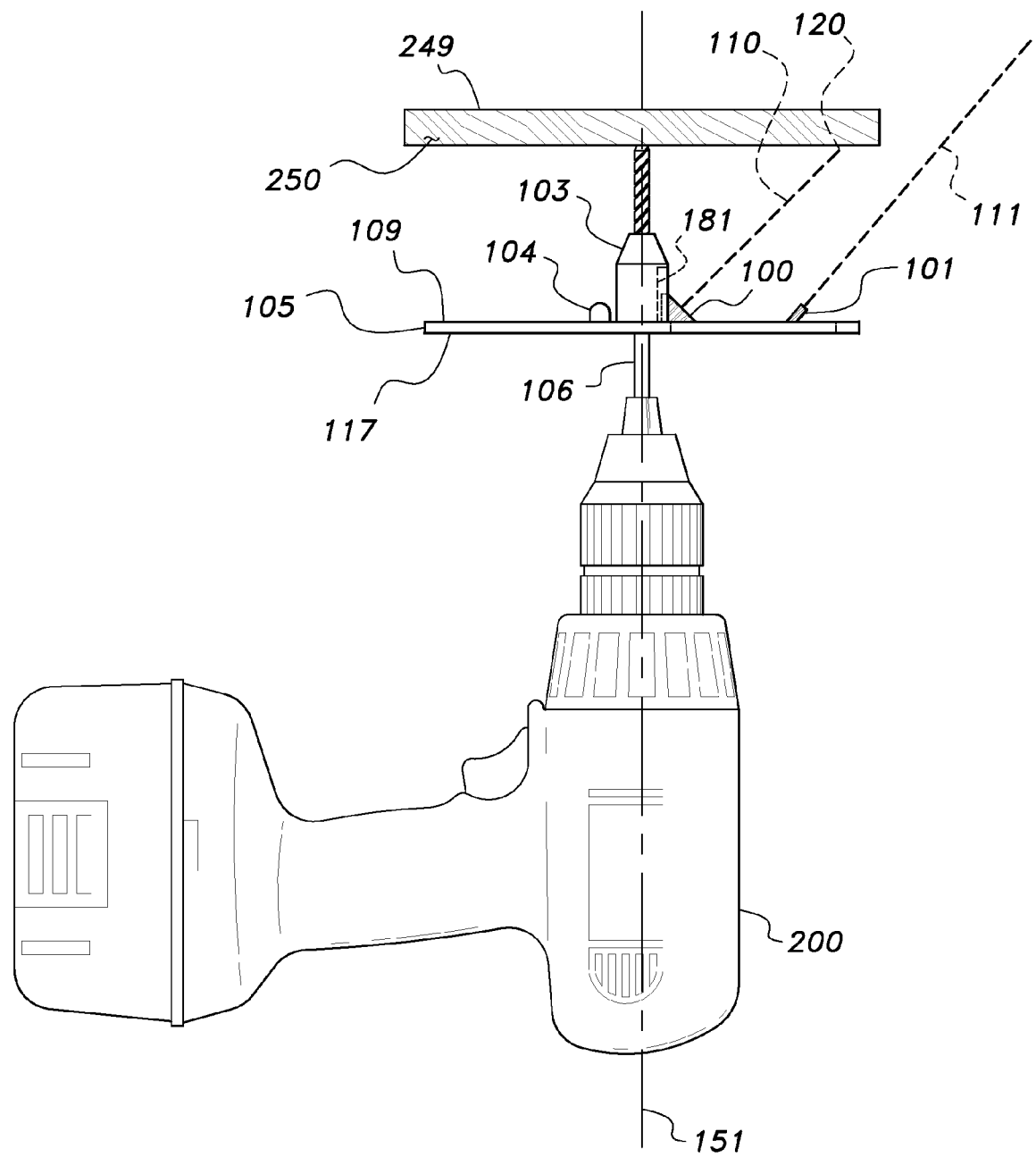
FIG. 12 showing light sources tilted at an angle according to the present invention.

In another embodiment, one or more of the light sources have the capability to tilt along their X or Y axis's. This provides further capability for alignment with work surface (or adjacent surface) elements. As depicted in FIG. 12, second light source 101 is tilted along its X axis. In this embodiment, it could also tilt along its Y axis, or some combination of X and Y.

Light: Sources, Manipulation, and Positioning

The system and its various embodiments can use a variety of light sources, light source manipulation, and light source positioning. These may be implemented alone or in various combinations.

In the one embodiment, the light sources or sources are laser light sources. In another embodiment, the light sources are LEDs (Light Emitting Diodes), or some other preferably low-power illumination source. Different types of light sources may also be combined in a single embodiment. The light sources could, for example, be laser light sources that incorporate one or more diffractive optical elements (DOEs).

In another embodiment, the light source or sources may be integrated or combined directly with a power source as an independent unit. Such an embodiment allows a light source to essentially operate on its own without any direct integration into the body's power source 104. If the system does not require power for other system elements (besides light sources), then the use of such lights source/battery embodiments might eliminate the necessity for a body mounted power source 104.

In another embodiment, the light source or sources may be coupled with one or more lenses that manipulate the light projections. Such manipulations can include, but are not limited to projection shaping or focusing and may incorporate DOEs.

In another embodiment, the system may contain and use mirrored or reflective surfaces to reorient the light projections in an optimal direction or directions. A light source may, for example, be mounted in such a way that the projection is not pointing in an optimal direction. In this case, a mirrored or reflective surface may be used to reflect the light projection in the optimal direction.

In another embodiment, one or more lights and/or one or more reflective surfaces may be combined with one or more beam splitters or a similar mechanism known in the art. Beam splitters are used to split a single beam of light into two or more beams. An example of such an embodiment includes the use of a single laser projection that is split into two or more projections (FIG. 8).

In another embodiment, the directions of the projected light or lights are fixed with respect to the drill bit 157. Conversely, in another embodiment, the directions of the projected light or lights are adjustable with respect to the drill bit 157 and/or work surface 205 (see, for example, FIG. 12).

In another embodiment, the mounting position of the light source may be adjustable. Such adjustments may be horizontal with respect to the distance from the drill bit 157, vertical with respect to the distance from the tip 259 of the drill bit 157, or some combination thereof. Specifically, the horizontal position of one or more of the light sources can be adjusted on the body 105 such that the transverse distance of, for example, the second source of light 101 from the longitudinal axis 151 (and hence the distance of the second light source from the chuck 103 can be varied) thereby selectively varying the position of the second visible projection 121 on the work surface 250; and with respect to FIGS. 5A and 5B, where the vertical position or up/down position of the first light source 100 can be selectively varied with respect to the chuck 103.

Any suitable mechanism can be used to aid positioning the light sources such as, but not limited to: slots, channels, and grooves, snap-ins wherein one or more light sources are snapped into predetermined locations on the body 105, alone or in combination. For example, in FIG. 1B a slot 181 is shown whereby second light source 101 can be moved and selectively positioned. In FIG. 5A, a slot or channel 181 is shown attached to the chuck 103 as an aid for selectively positioning the first light source 100 with respect to the chuck 103.

In one embodiment the first light source 100 produces a first light beam 110 at a 45 degree angle with respect to the longitudinal axis 151. In this configuration of the invention either or both of the first and second light sources 100 and 101 are adjustable in terms of their position in order to selectively control the projection of the first and second light beams 110 and 111 with respect to a work surface 250.

In another embodiment, the lights may be added and removed individually. This provides the user with a tremendous amount of flexibility with regards to system configuration and customization.

In another embodiment, the system has a single light source 100 or 101 that projects first and second visible projections 120 and 121 onto the work surface 250. In this embodiment, the first and second visible projections 120 and 121 generate first and second rotating light projections 130 and 131, which take the form of generate first and second concentric circle projections when the power drill 200 is aligned perpendicularly with respect to the work surface 250. The first and second rotating light projections 130 and 131 can be used in conjunction with position and/or orientation of the drill bit 157 on the work surface 250 to visually align the drill 200 both vertically and horizontally with regards to the work surface 250. For example, if the drill bit 157 is not essentially in the center of circular projection 130 produced by light source 100, the drill bit is misaligned with reference to the work surface 250.

Body Configurations

The system includes a body 105 on which at least some of the system elements are included.

Given the wide array of features and implementations offered by the system, the body 105 can take on a variety of shapes and sizes. Such shapes and sizes are often determined by factors such as: drill bit size, power drill physical form, chuck or cutting tool holder size and shape, light configurations, etc.

In one embodiment, the body 105 is simply a standard power drill chuck 103 with one or more light sources attached thereto. In this embodiment, the body itself 105 is the chuck or cutting tool holder 103.

The body 105 can take any suitable form such as a disk such as, but not limited to, a transparent or partially transparent disk, preferably made from a light-weight, rigid, and strong material. It should be noted that a transparent body of some form is preferred (e.g., transparent plastic or substantially transparent when the body 105 is rotating), as it provides the greatest amount of work surface and drill bit visibility. In this embodiment, a chuck or cutting tool holder 103 is also normally included.

Figure 15:
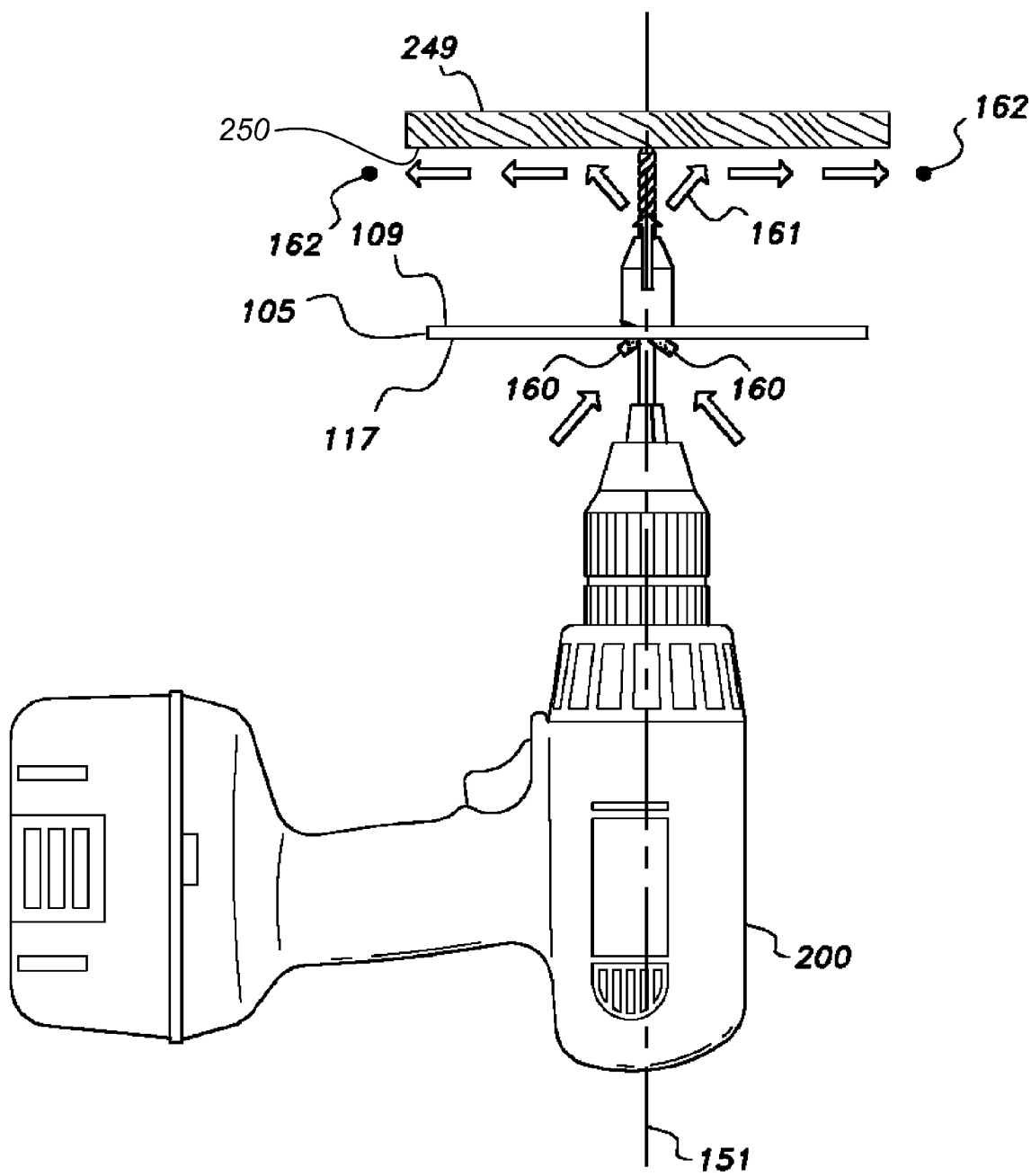
FIGS. 15 through 16B show an aspect of the invention designed to remove debris.
Figure 16A:
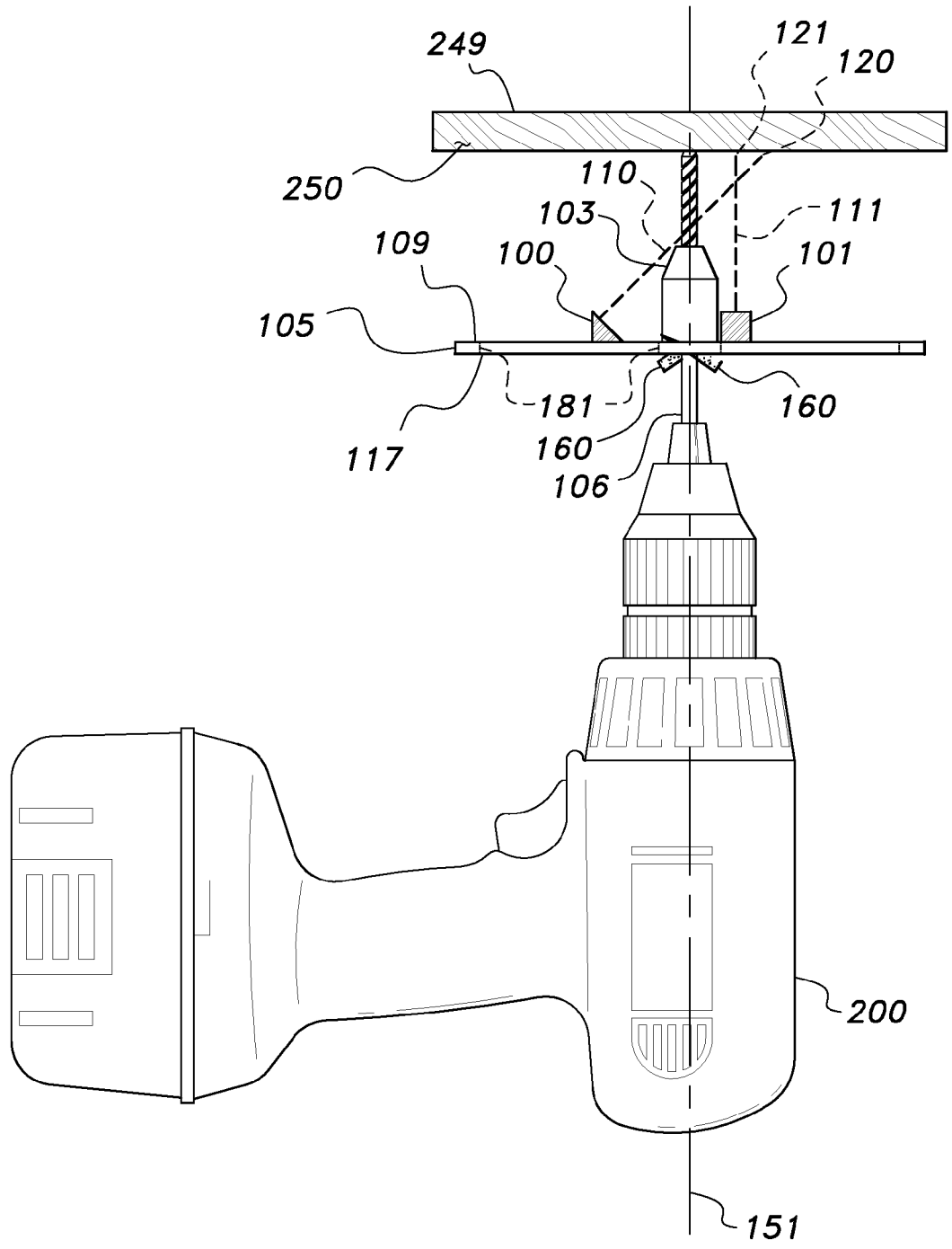
Figure 16B:
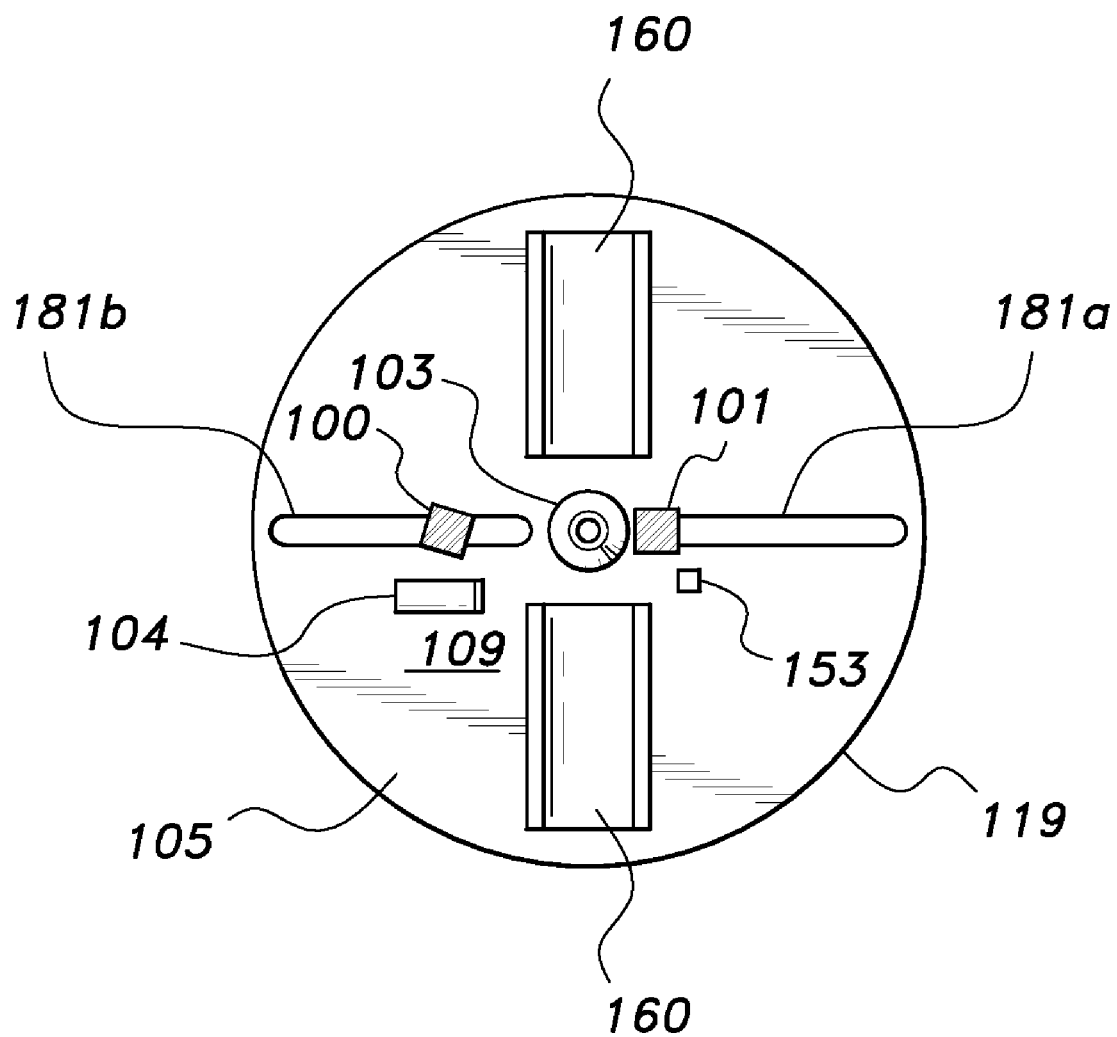

In another embodiment (FIG. 15), the body 105 or some other element of the system could be configured so that it produces an air current while rotating. This air current 161 or air flow would be essentially projected towards the work piece during drilling operations, and have the effect of blowing or pushing drill bit debris 162 away from the operating drill bit and/or work surface 250. Such air currents are advantageous to the power drill user as it allows them to better visualize the work surface and drill bit during drilling operations. In this embodiment, the elements that produce the air flow could be anything known in the art. This includes, but is not limited to airfoils 160, surface projections, or other techniques that can create air currents that are generally projected in a specific direction. FIGS. 15 through 16B depict the use of airfoils 160 to create an air current 161 that pushes debris 162 away from the work surface 250. The airfoils 160 can be fitted to the body 105 in all of the embodiments of the invention.

In another embodiment, the body 105 can either rotate in conjunction with the rotational portion of the rotary power tool or independently on its own. The later configuration allows the user to position the drill bit against the work surface and spin the body via a means other than that of the rotational force of the rotary power tool; this has the effect of producing circular projections on the work surface 250 without the need to engage the rotary power tool. This can be advantageous for a rotary power tool user since they can evaluate and correct for work surface misalignment prior to and without the need to begin boring operations. In one embodiment, the body can spin independently via a manual means. In another embodiment, an independent integrated rotational force such as an electric motor or wind-up engine can be utilized to rotate or spin the body without the necessity of engaging the rotary power tool.

Mounting and Chucking

The system can be mounted to the rotating portion of a power drill in a variety of ways. The system can be further implemented as either a permanent part of the tool or as an attachment to the tool.

In one embodiment related to mounting, the system is connected to the drill through a standard means known in the art. This includes, but is not limited to a shaft 106 that attaches to the power drill's existing chuck, a standard chuck socket that attaches to the power drill's rotating output shaft (thus replacing the drill's chuck), or a quick change chuck mechanism like those offered by San Ou Machinery Limited Company of Zhejiang China.

The system can also provide a means of locking the drill bit or cutting tool into the rotating system. This can be done through a variety of methods known in the art, including but not limited to the integration of a chuck 103 into the system, e.g., a mechanism such as the Craftsman Speed-Lok® Quick Connector.

In another embodiment related to mounting, the system is connected to the drill by a chuck attachment mechanism. Such a mechanism attaches to some portion of the power drill's existing chuck 103 without interfering with the rotational operation of the chuck 103 or the drill bit 157.

In yet another embodiment related to mounting, the system is attached to the drill bit 157. In this embodiment, the system is attached in such a way as to not interfere with the rotational operation of the chuck 103 or the drill bit 157.

Power

The system can use a variety of power sources. These power sources provide electricity for the lights and any other associated electrical components.

In the one embodiment, the power source 104 is one or more batteries that are integrated in the system. The batteries may be any type known in the art, including but not limited to disposable or rechargeable batteries. The batteries may be mounted on or in the body in a variety of positions. In another embodiment, the power source may be the electrical source of the power drill itself. In yet another embodiment, power may be obtained by converting the kinetic energy (obtained from the rotation of the system) into electricity.

In one embodiment, the entire system can be powered on and off via a single power switch. In another embodiment, the system functions can be powered on and off in groups via a single switch.

In another embodiment, the system may contain two or more switches that control individual system elements or groups of system elements. An example could be a set of power switches that individually control a group of lights that are used for a specific purpose, such as a configuration for visual work surface alignment (light sources 100 and 101) versus a configuration for visual drill bit or cutting tool work surface positioning light sources 101 and 102.

In another embodiment, the system can be automatically turned on by movement or rotation, and/or automatically turned off by some period of non-movement or inactivity.

In another embodiment, the light source mounting positions are configured so light power is easily obtained through the built-in connectors.

In another embodiment, each light source may be integrated or combined directly with a power source as an independent unit. Such an embodiment allows a light source to essentially operate on its own without any direct integration into or need for a body-mounted power source.

Informational Feedback

The system may also provide some sort of informational display or feedback for the user. Such feedback could be visual, audible, or tactile in nature. The information supplied to the user could include, but is not limited to elements such as rotational direction (forward or reverse), rotational RPMs, drill bit temperature, sensor-based visualization, microwave or other types of imaging, etc.

Figure 13:
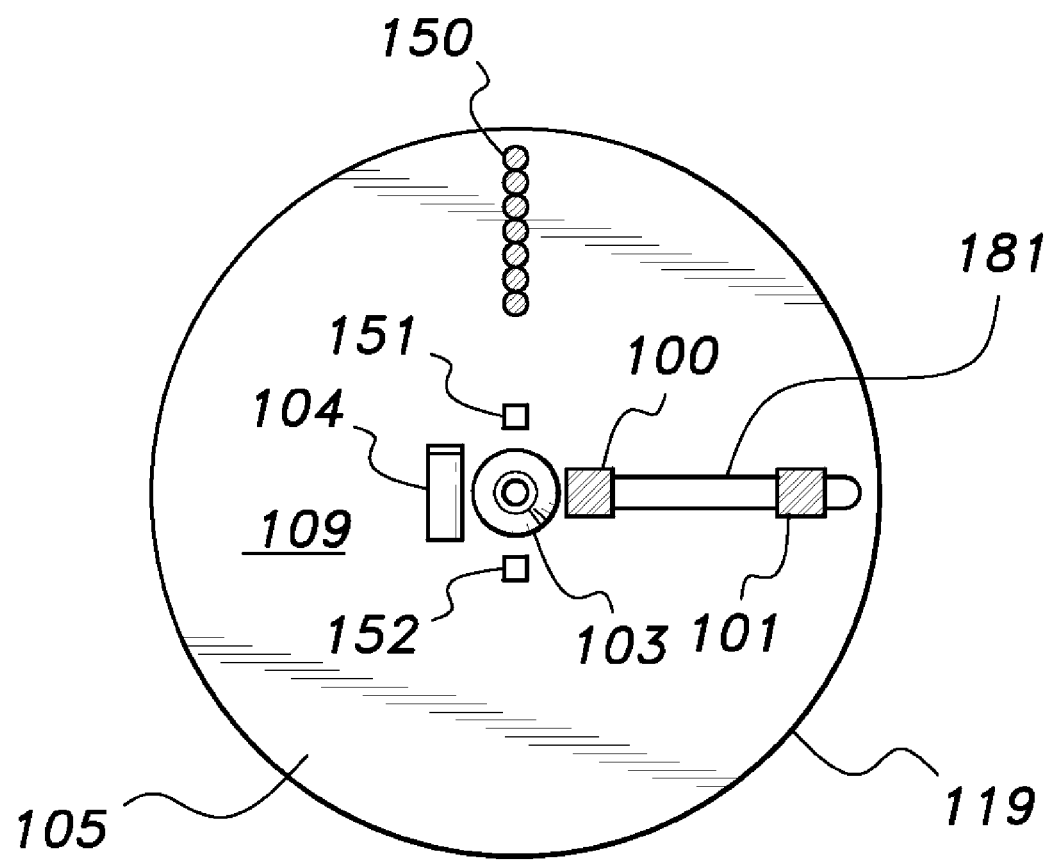
FIG. 13 shows a persistence of vision setup according to the invention.

In one embodiment, the display could be as simple as an LCD that can be seen when the Drill Guide is not rotating. In another embodiment, the display could be a Persistence of Vision (POV) system that can actually display text and/or graphics during rotation of the system (see FIG. 13). The POV display is pictured as a series of 7 LEDs lights 150, but may be anything known in the art.

In yet another embodiment, the display can be projected onto a work surface 250.

Figure 18:
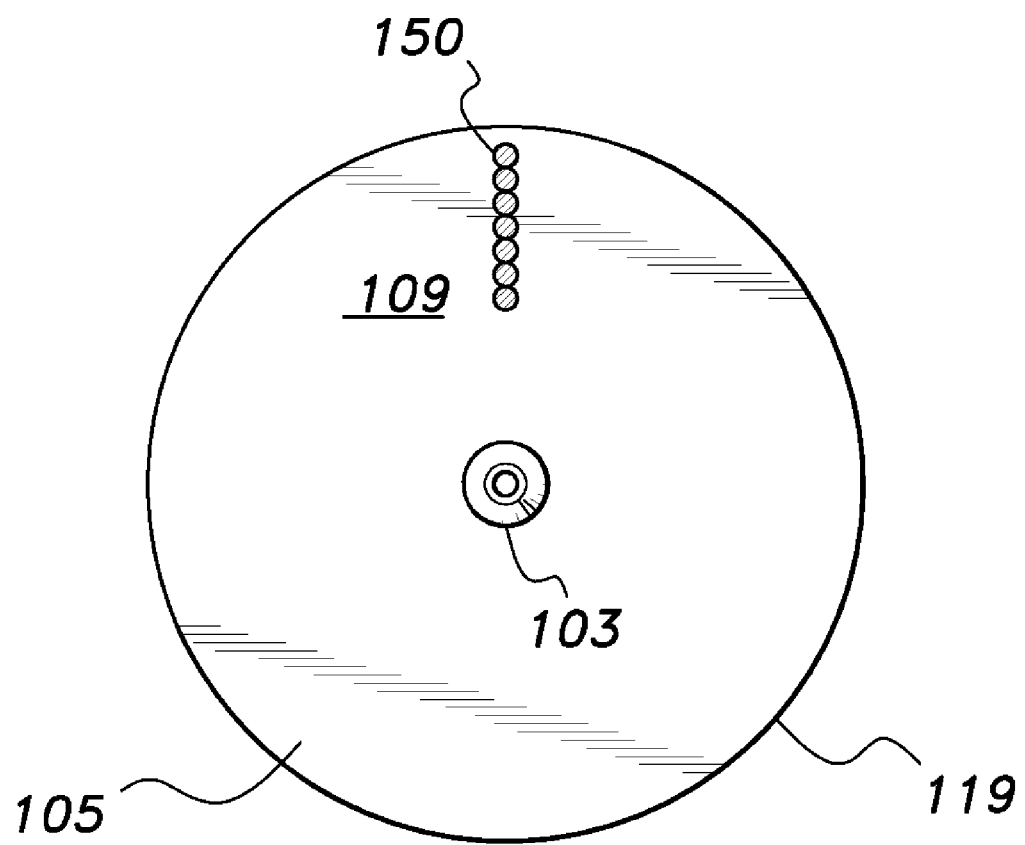
FIGS. 18 and 19 show an example of a Persistence of Vision (POV) aspect of the invention.

In another embodiment, the informational display can be implemented as a stand-alone system. FIG. 18 depicts an example of this embodiment that includes a Persistence of Vision (POV) system 150 on a body 105 that is devoid of the first and second light sources 100 and 101.

Microcontroller, Sensor, and/or IC Integration

In one embodiment (FIG. 13), the system includes an accelerometer 1511 sensor or other rotational sensor that can measure the rotational characteristics of the system. In another example (FIG. 16), the system uses an inertial motion sensor 153 as a means of automatically turning the power on and off. In another example (FIG. 13), the system may combine one or more sensors or electronic components with a microcontroller 152 or other computing unit such as a computer processor. This computing unit could be used to add variety of features known in the art. These could include, but are not limited to, enhancing the capabilities of the sensor (or sensors), driving a user feedback or display system, regulating and managing the power system, turning the light sources on and off, etc.

The system may contain other sensors that are used for sub-surface visualization. Examples include the use of microwave sensors, thermal imaging sensors or functionally equivalent sensors to detect sub-surface obstructions or drill-bit positioning reference elements (located underneath the work surface). Such sensors could be integrated with the system's body 105, power source 104, microcontroller 152 or computing unit, and informational feedback elements.

Figure 19:
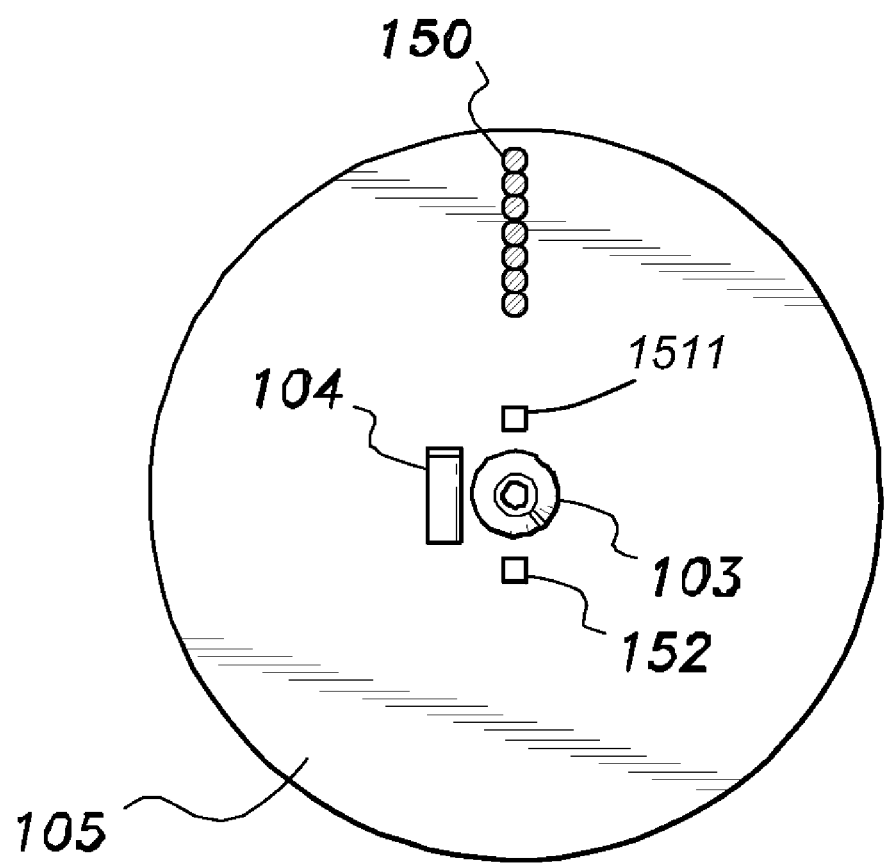

In another embodiment, the one or more sensors, one or more microcontrollers, or one or more ICs, can be implemented as a stand-alone system. FIG. 19 depicts an example of this embodiment that includes a Persistence of Vision (POV) system 150 on a body 105 with an accelerometer 1511 and a microcontroller 152 that is devoid of the light sources 100 and 101.

Counter Balancing

Since rotary power tools typically operate in the 0 to 3000+ RPM range, the system will need to be properly balanced for stable rotation on the tool. The system may accomplish this in several ways.

In one embodiment, the system elements are distributed throughout the body in a generally balanced manner so that the ad-hoc adjustment or addition of lights is generally offset by the static weight distribution of the body 105, chuck or cutting tool holder 103, and power source 104.

In another embodiment, the power source location may be altered to offset the ad-hoc adjustment or addition of light sources.

Figure 17:
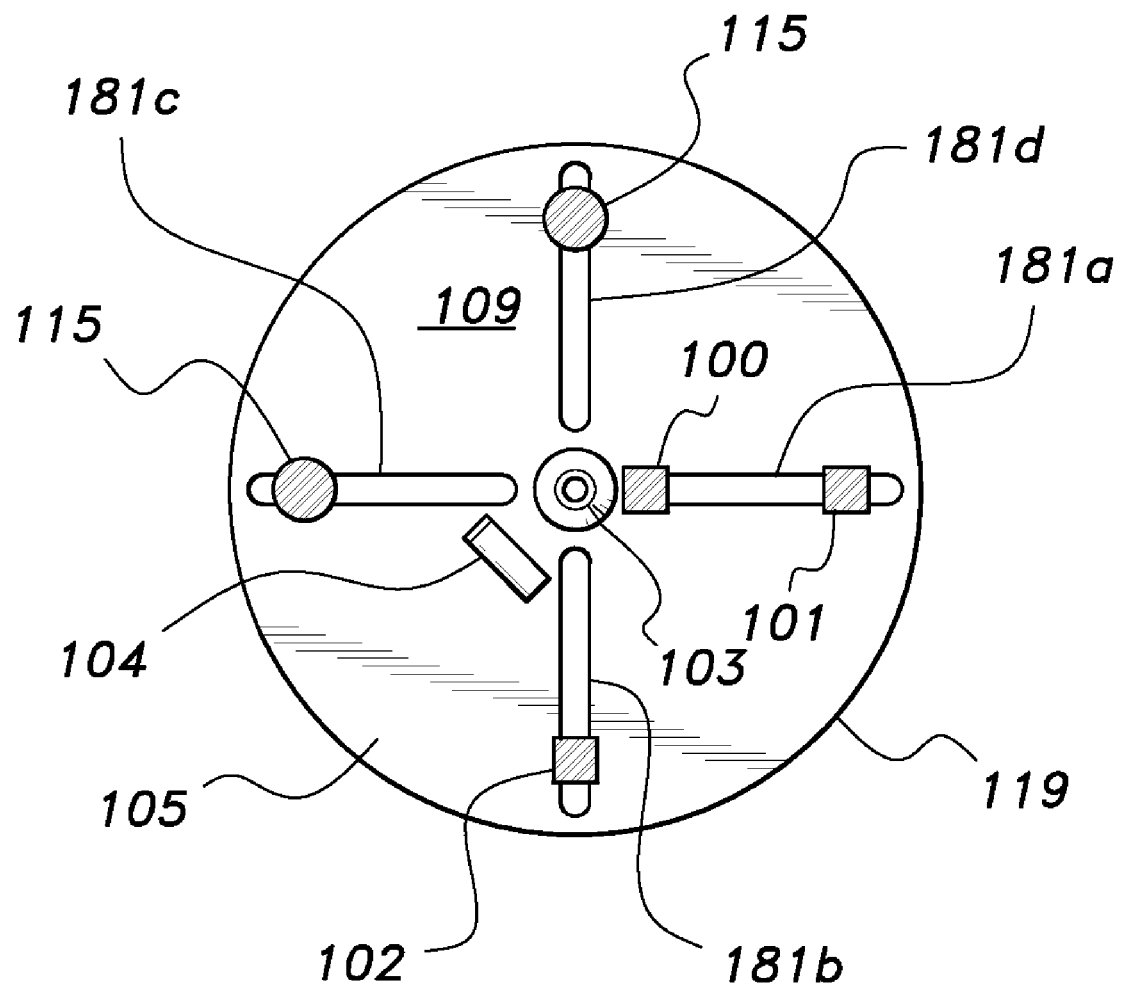
FIG. 17 shows an aspect of the invention involving the deployment of counter-weights.

In another embodiment (FIG. 17), the body may include or provide for the ability to add counter weights 115 that can be used to offset the ad-hoc adjustment or addition of lights. Slots or channels 181 (labeled as 181*a* through 181*d* in FIG. 17) can be used to move the counter weights 115 about the top 109 or bottom 117 surface of the body 105; in FIG. 17 the slots or channels are labeled as 181*a* through 181*b*.

In yet another embodiment, the body contains a mechanism for dynamic counter-balancing. In this configuration, any ad-hoc adjustment or addition of light sources is automatically offset by one or more counter-balance mechanisms.

An operator could choose to use the invention merely as an alignment system and ignore the depth indication system aspects of the invention. This embodiment can apply to a rotary boring tool (such as, but not limited to: a power drill 200 or a stationary drill press or a smaller Dremel® drill tool) having a rotatable drill bit 157, wherein the drill bit 157 is attached to a cutting-tool holder such as a chuck 103, the tool having a longitudinal axis 151, wherein the tool is used to drill holes in a work surface 250 of a work piece 249, comprising:

first and second light sources 100 and 101; and a body 105 for operably coupling the first and second light sources 100 and 101 to the cutting-tool holder such that the first and second light sources 100 and 101 are located in the same transverse plane with respect to the longitudinal axis, wherein the first and second light sources 100 and 101 respectively produce first and second light beams 110 and 111, wherein the second light beam 111 is projected parallel to the longitudinal axis, wherein during normal operation of the alignment system the first and second light beams 110 and 111 combine with a work surface 250 to create a 45°-45°-90° right angle triangle, whereupon operation of the rotary boring tool and when the rotary boring tool is held perpendicular to a work surface 250 of a work piece 249 the first and second beams of light 110 and 111 project inner and outer concentric circles 130 and 131 of light onto the work surface 250 thereby confirming that the rotary boring tool is being held at a perpendicular angle with respect to the work surface 250, wherein the first and second light sources 100 and 101 are positioned on the same side of the cutting-tool holder as depicted, for example, in FIG. 5A or on opposite sides of the cutting-tool holder as depicted, for example, in FIG. 1A, and wherein this embodiment may include airfoils 160 coupled to the body 105 for moving drill debris away from the work surface 250 while drilling into the work piece 249, as depicted, for example, in FIGS. 15 through 16B.

What is claimed:

1. An alignment and depth indication system with respect to a tool having a rotating means for rotating a drill bit, said rotating means having a longitudinal axis, comprising:

first and second light sources; and a means for operably coupling said first and second light sources to said rotating means, whereby wherein said first and second light sources respectively produce first and second light beams, wherein said first light beam is projected at an adjustable acute angle with respect to said longitudinal axis, and said second light beam is projected parallel to said longitudinal axis, whereupon rotation of said rotating means and when said rotating means is held perpendicular to a work surface of a work piece said first and second beams of light project inner and outer concentric circles of light on the work surface thereby confirming that the tool is being held at a perpendicular angle with respect to the work surface, wherein said acute angle can be selected such that said first light beam defines the outer concentric circle of light, and wherein the distance between the outer and inner circles of light corresponds to a desired drill depth, whereupon drilling into the work surface the desired drill depth is achieved when the outer concentric circle of light merges with the inner circle of light to produce a single circle of light on the work surface.

2. The alignment and depth indication system of claim 1, wherein said means for operably coupling said first and second light sources to said rotating means is a circular substantially transparent disk mounted transversely to said tool with respect to said longitudinal axis.

3. The alignment and depth indication system of claim 1, wherein said means for operably coupling said first and second light sources to said rotating means is a circular body of generally planar shape mounted symmetrically and transversely to said tool with respect to said longitudinal axis, said circular body having a top surface, wherein said first and second light sources are mounted on said top surface of said circular body, wherein at least one additional light source is mounted on said top surface of said body, wherein at least one of said additional light sources projects a light beam parallel to said longitudinal axis to provide the tool with at least two light beams parallel to said longitudinal axis such that with respect to a work piece having at least two features of interest a tool operator can manually rotating said circular body to line up parallel light beams with respect to at least two features of interest on the work piece to facilitate the tool operator in placing a drill bit at a desired point on the work piece.

4. The alignment and depth indication system of claim 1, wherein said means for operably coupling said first and second light sources to said rotating means is a disk having a means for producing air flow to blow drill bit debris away from the tool.

5. A tool having a rotating means for rotating a drill bit attached to a cutting-tool holder, said rotating means having a longitudinal axis, wherein said tool is used to drill holes in a work surface of a work piece, said tool comprising:

first and second light sources; and a means for operably coupling said first and second light sources to said rotating means such that said first and second light sources are located in the same transverse plane with respect to the longitudinal axis, wherein said first and second light sources respectively produce first and second light beams, wherein said second light beam is projected parallel to said longitudinal axis, wherein during normal operation of said alignment system the first and second light beams combine with a work surface to create a 45°-45°-90° right angle triangle, wherein said means for operably coupling said first and second light sources to said rotating means is a disk having a means for producing air flow to blow drill bit debris away from the tool, and whereupon rotation of said rotating means and when said rotating means is held perpendicular to a work surface of a work piece said first and second beams of light project inner and outer concentric circles of light on the work surface thereby confirming that the tool is being held at a perpendicular angle with respect to the work surface.

6. The alignment and depth system of claim 5, wherein said first and second light sources are positioned on the same side of the cutting-tool holder, wherein said first light source is orientated such that said first light source is orientated to project said first light beam to at least partly avoid the drill bit.

7. The alignment and depth system of claim 5, wherein said first and second light sources are positioned on the same side of the cutting-tool holder.

8. The alignment and depth system of claim 5, wherein said first and second light sources are positioned on the same side of the cutting-tool holder, and wherein said cutting-tool holder is a chuck.

9. A tool having a rotating means for rotating a drill bit, said rotating means having a longitudinal axis, said tool comprising:

first and second light sources; and a means for operably coupling said first and second light sources to said rotating means, whereby wherein said first and second light sources respectively produce first and second light beams, wherein said first light beam is projected at an acute angle with respect to said longitudinal axis, and said second light beam is projected parallel to said longitudinal axis, whereupon rotation of said rotating means said first and second light beams project first and second circles of light on a work surface such that when the drill bit of the tool is perpendicular to the work surface the diameters of said first and second circles of light are equal in size and therefore overlap thereby confirming to an operator that the tool is drilling perpendicularly with respect to the work surface.

10. The alignment and depth indication system of claim 9, wherein said means for operably coupling said first and second light sources to said rotating means is a disk having a means for producing air flow to blow drill bit debris away from the tool.

* * * * *